US010945448B2

(12) United States Patent
Damodaran et al.

(10) Patent No.: US 10,945,448 B2
(45) Date of Patent: Mar. 16, 2021

(54) PROCESS FOR REMOVING PHOSPHOLIPIDS AND OFF-FLAVORS FROM PROTEINS AND RESULTING PROTEIN PRODUCT

(75) Inventors: Srinivasan Damodaran, Middleton, WI (US); Akshay Arora, Madison, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 2305 days.

(21) Appl. No.: 12/861,077

(22) Filed: Aug. 23, 2010

(65) Prior Publication Data
US 2011/0045128 A1 Feb. 24, 2011

Related U.S. Application Data

(60) Provisional application No. 61/235,821, filed on Aug. 21, 2009.

(51) Int. Cl.
*A23J 3/16* (2006.01)
*A23L 5/20* (2016.01)
*A23L 11/30* (2016.01)

(52) U.S. Cl.
CPC ............... *A23J 3/16* (2013.01); *A23L 5/273* (2016.08); *A23L 11/34* (2016.08)

(58) Field of Classification Search
CPC ......... A23J 3/16; A23L 1/0156; A23L 1/2115; A23L 1/2113; A23L 1/034; A23L 1/0153; A23L 1/211; C07K 1/14
USPC .............................. 426/18, 46, 244, 656, 442
See application file for complete search history.

(56) References Cited

U.S. PATENT DOCUMENTS

| | | | | |
|---|---|---|---|---|
| 4,129,664 A | * | 12/1978 | Kruseman et al. | 426/7 |
| 5,063,077 A | * | 11/1991 | Vollbrecht et al. | 426/614 |
| 5,560,950 A | * | 10/1996 | Conte et al. | 426/330.6 |
| 5,563,057 A | * | 10/1996 | Gellman et al. | 435/188 |
| 2003/0215559 A1 | * | 11/2003 | Mikaelian | A21D 2/266 426/634 |
| 2004/0234631 A1 | * | 11/2004 | Hoie | A61K 36/48 424/757 |
| 2009/0053368 A1 | * | 2/2009 | Fox et al. | 426/92 |

FOREIGN PATENT DOCUMENTS

WO   WO2007113257   * 10/2007

OTHER PUBLICATIONS

Schwartz. 2003. Diafiltration for Desalting or Buffer Exchange. Bioprocess International. pp. 43-44.*
Arora. 2008. Beta-cyclodextrin Mediated Removal of off-flavor Volatiles and Their Precursors from Soy Protein. pp. 59, 60, 63. Accessed online.*
Shurtleff et al., 2001. Tofu & Soymilk Production: A Craft and Technical Manual Soyfoods Production Series: No. 2. Soyinfo Center. Edition 3; pp. 122-123.*
Min et al. 1989. Flavor Chemistry of Lipid Foods. The American Oil Chemists Society. p. 384 Accessed online: http://books.google.com/books?id=QUvIT1i6WVEC&dq=Cyclodextrin+chemistry+lipid&source=gbs_navlinks_s.*
Ohtani et al. 1989. Differential effects of α-, β-, γ—cyclodextrins on human erythrocytes. Eur. J. Biochem. 186:17-22.*
Eskin, N.A. Michael Shahidi, Fereidoon (2013). Biochemistry of Foods (3rd Edition). pp. 546-547. Elsevier. Online version available at:http://app.knovel.com/hotlink/toc/id:kpBFE00012/biochemistry-foods-3rd.*
Szuhaj, Bernard. 2005. Bailey's Industrial Oil and Fat Products, vols. 3 (6th Edition), chapter 13, pp. 366-368.*
Spiller (book, Handbook of Lipids in Human Nutrition).*
Fennema et al. 2007. Fennema's Food Chemistry. CRC Press. p. 186. Accessed online.*
Alahverdjieva et al., 2005. A kinetic study of the formation of β-cyclodextrin complexes with monomolecular films of fatty acids and glycerides spread at the air/water interface. *Colloids and Surfaces B: Biointerfaces* 42(1):9-20.
Anderson et al., 1982. An organic phosphorus assay which avoids the use of hazardous perchloric acid. *Clin Chim Acta* 121(1):111-116.
Bender et al., 1978. "Cyclodextrin Chemistry." Berlin, Germany: Springer-Verlag.
Boatright et al., 1995. Effect of lipids on soy protein isolate solubility. *Journal of the American Oil Chemists' Society* 72(12):1439-1444.
Brockerhoff H. 1963. Breakdown of phospholipids in mild alkaline hydrolysis. *The Journal of Lipid Research* 4(1):96-99.
Connors K. A. 1997. The Stability of Cyclodextrin Complexes in Solution. *Chem. Rev.* 97(5):1325-1358.
Damodaran et al., 1981. Interaction of carbonyls with soy protein: thermodynamic effects. *J. Agric. Food Chem.* 29(6):1249-1253.
Debouzy et al., 1998. Mechanism of a-cyclodextrin induced hemolysis. 2. A study of the factors controlling the association with serine-, ethanolamine-, and choline-phospholipids. *J. Pharm. Sci* 87(1):59-66.
Dennis E. A. 1983. "The Enzymes." New York: Academic Press.
Fauvelle et al., 1997. Mechanism of a-cyclodextrin-induced hemolysis. 1. The two-step extraction of phosphatidylinositol from the membrane. *J. Pharm. Sci.* 86(8):935-943.

(Continued)

*Primary Examiner* — Jill A Warden
(74) *Attorney, Agent, or Firm* — Daniel A. Blasiole; DeWitt LLP

(57) ABSTRACT

Described are methods of removing phospholipids and other off-flavor-causing compounds from edible proteins using a cyclodextrin treatment. The methods include treating soy protein with cyclodextrins such as β-cyclodextrin to form cyclodextrin-compound complexes and then separating the resulting complexes from the protein. Optionally, prior to treating the protein with cyclodextrin, the protein is sonicated and then treated with a phospholipase, such as phospholipase $A_2$. Versions of the methods described herein are capable of removing more than 99% of phospholipids from soy protein.

27 Claims, 6 Drawing Sheets

(56) References Cited

OTHER PUBLICATIONS

Grauby-Heywang et al., 2008. Study of the interaction of [beta]-cyclodextrin with phospholipid monolayers by surface pressure measurements and fluorescence microscopy. *Journal of Colloid and Interface Science* 322(1):73-78.
Han et al., 1998. Purification and Characterization of Protease Q: A Detergent- and Urea-Stable Serine Endopeptidase from Bacillus pumilus. *J. Agric. Food Chem.* 46(9):3596-3603.
Hatzi et al., 2007. Integrity of liposomes in presence of cyclodextrins: Effect of liposome type and lipid composition. *International Journal of Pharmaceutics* 333(1-2):167-176.
Homma et al., 1985. Lipids in the Soy Protein Isolate with Beany Flavor Compounds. *Daizu Tanpakushitsu Eiyo Kenkyukai Kaishi* 6(1):7-10.
Honig et al., 1979. Effects of residual solvents and storage on flavor of hexane/ethanol azeotrope extracted soy products. *J. Agric. Food Chem.* 27(6):1383-1386.
Ivanova et al., 1996. Hydrolysis of monomolecular films of long chain phosphatidylcholine by phospholipase A2 in the presence of B-cyclodextrin. *Colloids and Surfaces B: Biointerfaces* 6(1):9-17.
Layne E. 1957. Spectrophotometric and turbimetric methods for measuring proteins. *Methods in Enzymology* 10:447-455.
Lee et al., 1996. A simple and rapid solvent extraction method for determining total lipids in fish tissue. *J AOAC Int* 79(2):487-492.
Lendrath G. 1990. Behavior of Vegetable Phospholipids in Thin-Layer Chromatography: Optimization of Mobile Phase, Detection and Direct Evaluation. Journal of Chromatography 502:385.
Li et al., 2005. Analysis of Fatty Acids in Food Lipids. Unit D1.2.1. In: Wrolstad, R. E., Acree, T. E., Decker, E. A., Penner, M. H., Reid, D. S., Schwartz, S. J., Shoemaker, C. F., Smith, D. S. & Sporns, P., editors. Handbook of Food Analytical Chemistry. First ed. Hoboken, NJ: Wiley-Interscience. p. 437-451.
Lichtenberg et al., 1981. Molecular packing and stability in the gel phase of curved phosphatidylcholine vesicles. Lipids 16(7):555-557.
Mabrouk et al., Solubility of linoleic acid in aqueous solutions and its reaction with water. Journal of the American Oil Chemists' Society 38(1):9-13.
Menashe et al., 1986. Hydrolysis of dipalmitoylphosphatidylcholine small unilamellar vesicles by porcine pancreatic phospholipase A2. Journal of Biological Chemistry 261(12):5328-5333.
Meneses et al., 1988. High resolution 31P-NMR of extracted phospholipids. The Journal of Lipid Research 29(5):679-689.
Nieuwenhuizen et al., 1974. Phospholipase A2 (phosphatide acylhydrolase, EC 3.1. 1.4) from porcine pancreas. Methods Enzymol 32(Part B):147-154.
Nishijo et al., 1998. Interactions of cyclodextrins with DPPC liposomes. Differential scanning calorimetry studies. Chem Pharm Bull (Tokyo) 46(1):120-124.
Nishijo et al., 2000. Interactions of cyclodextrins with dipalmitoyl, distearoyl, and dimyristoyl phosphatidyl choline liposomes. A study by leakage of carboxyfluorescein in inner aqueous phase of unilamellar liposomes. Chem. Pharm. Bull 48(1):48-52.

Ohtani et al., 1989. Differential effects of alpha-, beta-and gamma-cyclodextrins on human erythrocytes. Eur J Biochem 186(1-2):17-22.
Ohtsuru et al., 1983. Association of phosphatidylcholine with soybean 11S globulin. Agricultural and Biological Chemistry 47(8):1907-1908.
Ohtsuru et al., 1979. Association of phosphatidylcholine with soybean 7S globulin and its effect on protein conformation. Agricultural and Biological Chemistry 43(4):765-770.
Piel et al., 2007. Study of the relationship between lipid binding properties of cyclodextrins and their effect on the integrity of liposomes. International Journal of Pharmaceutics 338(1-2): 35-42.
Puglisi et al., 1996. Interaction of Natural and Modified β-Cyclodextrins with a Biological Membrane Model of Dipalmitoylphosphatidylcholine. Journal of Colloid and Interface Science 180(2):542-547.
Rao et al., 2004. Surface pressure dependence of phospholipase A2 activity in lipid monolayers is linked to interfacial water activity. Colloids and Surfaces B: Biointerfaces 34(3):197-204.
Rulis A. M. 2001. Agency Response Letter. GRAS Notice No. GRN 000074. Office of Food Additive Safety. Center for Food Safety and Applied Nutrition. http://www.cfsan.fda.gov/~rdb/opa-g074.html Accessed online in Jun. 20, 2003.
Samoto et al., 2007. Abundant proteins associated with lecithin in soy protein isolate. Food Chemistry. Food Chemistry 102:317-322.
Samoto et al., 1998. Improvement of the off-flavor of soy protein isolate by removing oil-body associated proteins and polar lipids . . . Bioscience, Biotechnology, and Biochemisry 62(5):935-940.
Shantha et al., 1992. Gas chromatography of fatty acids. J Chromatogr 624(1-2):37-51.
Six et al., 2000. The expanding superfamily of phospholipase A2 enzymes: classification and characterization. BBA—Molecular and Cell Biology of Lipids 1488(1-2):1-19.
Slotboom et al., 1982. Phospholipids. Elsevier Press, Amsterdam, The Netherlands.
Smith et al., 1995. Cholesterol Reduction in Liquid Egg Yolk using β-Cyclodextrin. Journal of Food Science 60(4):691-694.
Sotirhos et al., 1986. Quantitative analysis of phospholipids by 31P-NMR. The Journal of Lipid Research 27(4):386-392.
Taneva et al., 1989. Association of amphiphilic cyclodextrins with dipalmitoylphosphatidylcholine in mixed insoluble monolayers at the air-water interface. Journal of Colloid and Interface Science 131(2):561-566.
Tarantino L. M. 2007. Agency Response Letter. GRAS Notice No. GRN 000212.: Office of Food Additive Safety. Center for Food Safety and Applied Nutrition.
Tzen et al., 1992. Surface structure and properties of plant seed oil bodies. Journal of Cell Biology. Journal of Cell Biology 117:327-335.
Wolfe S. L. 1993. Molecular and cellular biology. Wadsworth Publishing Company.
Yu et al., 1993. The divalent cation is obligatory for the binding of ligands to the catalytic site of secreted phospholipase A2. Biochemistry 32(25):6485-6492.

\* cited by examiner

PROCESS FOR REMOVING PHOSPHOLIPIDS AND OFF-FLAVORS FROM PROTEINS AND RESULTING PROTEIN PRODUCT

CROSS REFERENCE TO RELATED APPLICATIONS

This application claims priority under 35 USC § 119(e) to U.S. Provisional Patent Application 61/235,821 filed Aug. 21, 2009, the entirety of which is incorporated herein by reference.

STATEMENT REGARDING FEDERALLY SPONSORED RESEARCH

This invention was made with United States government support awarded by the following agencies: USDA/CS-REES 2006-35503-16998. The United States government has certain rights in this invention.

FIELD OF THE INVENTION

The invention is directed to a method for removing phospholipids and other contaminants that cause off-flavors in proteins in general (and soy protein isolate in particular) destined for animal or human consumption.

BACKGROUND

Most native proteins are bland and lack discernible flavors of their own. But proteins often influence flavor perception by directly interacting with flavor compounds, or by acting upon flavor precursors, e.g. via Strecker degradation of amino acids, or selective enzymatic hydrolysis (Kinsella and Damodaran, 1980). The ability of some proteins to bind flavor compounds has the most discernable impact on flavor retention, flavor modification, and transmission of off-flavors in foods. These phenomena are particularly evident in foods containing protein derived from soy, known as soy protein. In raw crushed soybean or full-fat soybean flours, oxidation of polyunsaturated fatty acids generates lipohydroperoxides, which ultimately break down into volatile compounds such as aldehydes, ketones, aliphatic esters, alcohols etc. These compounds bind to soy protein and are carried into formulated foods. During preparation or consumption of soy protein-containing products, these compounds are released and contribute to a beany/grassy smell and a bitter taste, even at very low concentrations (Arai, 1966; Fujimaki et al. 1965; Sessa et al. 1969). Removing these off-flavor compounds by traditional processing techniques has proven difficult on account of their strong interaction with soy protein. Additionally, use of flavorings in soy-protein products has yielded only limited success because of flavor modification and/or flavor fade caused by interaction of the added flavorings with the soy protein. As a result, food products containing soy protein often possess an objectionable taste or smell and hence find limited consumer acceptability.

Generally, compounds that generate off-flavors in proteins are divided into two classes: (i) phospholipids containing ester-bound polyunsaturated fatty acids; and (ii) non-volatile compounds that contribute to off-flavors directly (e.g., phenolic acids, isoflavones, etc.) or produce off-flavors upon thermal or oxidative breakdown, (e.g., peptides, carbohydrates, vitamins etc.).

Phospholipids, by far, are considered to be single largest contributor to off-flavors in proteins in general and soy proteins in particular. Due to their polar nature and strong binding with oleosins, phospholipids are not efficiently removed by hexane extraction. (Hexane extraction is the most commonly employed method to remove lipid content from crushed soybean.) Defatted soybean meal typically contains about 2 to 4% (w/w) phospholipids (Eldridge et al. 1963; Wu and Wang, 2003). Consequently, protein-bound phospholipids remain in soy protein products such as soy protein concentrate and soy protein isolate.

It is generally thought that there are three predominant pathways by which phospholipids generate off-flavors (Sessa 1985): (i) phospholipids provide a source of polyunsaturated fatty acid that undergoes oxidation to produce off-flavors; (ii) phospholipids containing ester-bound, oxidized fatty acids possess off-flavor themselves; (iii) reactive carbonyl species resulting from polyunsaturated fatty acid oxidation react with the amine-containing amino acid residues of phospholipids to yield carbonyl-amine compounds having off-flavors. The presence of these off-flavors, whatever their cause, limits market acceptance of products containing concentrated or isolated protein products, especially protein products derived from soy.

SUMMARY OF THE INVENTION

In light of the discussion from above, an efficient and cost-effective method for removing residual phospholipid from soy protein is a long-felt and unmet need to solving the off-flavor problem in soy and other oilseed-derived proteins. In soybeans, phospholipid exists in the membrane surrounding oil bodies. Within this membrane, phospholipids interact and form non-covalent complexes with 18 to 34 kDa hydrophobic proteins called oleosins. It is estimated that approximately 13 phospholipid molecules interact with one oleosin molecule (Tzen and Huang, 1992). The oleosin-phospholipid membrane structure is separated from oil bodies during the commercial de-oiling process, but the integrity of oleosin-phospholipid membrane structure persists throughout the mechanical disruption of oil bodies and the hexane extraction process. After the de-oiling process, the oleosin-phospholipid complex remains in defatted soybean meal and precipitates along with soybean storage proteins during isoelectric precipitation (Samoto et al., 2007; Samoto et al. 1998). In addition, non-membrane phospholipid from soybean can also migrate to purified soy protein through non-specific interaction with 7S and 11S globulins (Ohtsuru and Kito, 1983; Ohtsuru et al. 1979). Consequently, phospholipid levels of from 2.5 to 3.3 wt % have been reported in commercial soy protein (Boatright and Hettiarachchy, 1995; Homma et al. 1985). This is the equivalent to a phospholipid content of from 25 to 33 mg phospholipid/g soy protein.

Removing phospholipid from purified proteins has proved difficult. Removing phospholipid from soy protein with solvents such as ethanol, isopropanol, hexane/alcohol azeotropes, supercritical carbon dioxide, and other solvent systems has been attempted but these processes inevitably cause protein denaturation and loss of protein solubility. In addition, residual solvents remaining in soy protein can contribute to off-flavors as well (Honig et al. 1979). Therefore, as noted above, there remains a long-felt and unmet need for a process that can remove phospholipids and other off-flavor-causing compounds from proteins in general, and soy proteins in particular, without adversely affecting the desirable functionality of the protein.

In the present method, the protein is contacted, in solution, with a cyclodextrin, preferably a β-cyclodextrin, which complexes with phospholipids found in the protein. The β-cyclodextrin-phospholipid complexes are then separated from the remaining protein by any means now known in the art or developed in the future. Dialfiltration is the preferred separation method. When practiced in combination with certain pre-treatment conditions, β-cyclodextrin is able to extract almost 99% of soy protein-bound phospholipid. In the case of soy protein-bound phospholipid, mere treatment of soy protein with β-cyclodextrin alone removes about 36% of soy protein-bound phospholipid. However, greater than 99% removal of soy protein-bound phospholipid is achieved by first sonicating soy protein (80 mg/mL) for 5 min at 50° C. followed by treatment with phospholipase $A_2$ for 2-3 h and finally equilibrating with 8-10 mM β-cyclodextrin for 30 min at pH 7.0.

β-cyclodextrin is a substance officially designated as "generally regarded as safe" (GRAS) by the U.S. government (GRAS notification #GRN 0000 74, issued by the U.S. Food and Drug Administration in 2001). Thus the present method is highly suitable for making food-grade proteins, such as soy proteins, that have excellent flavor stability.

Phospholipid reduction from soy protein is necessary in order to overcome its off-flavor and thereby increase the commercial utilization of soy protein. Treatment of soy protein with β-cyclodextrin in conjunction with sonication and phospholipase $A_2$ treatment, as described herein leads to an almost complete reduction of phospholipid. The method is easy to integrate with traditional soy protein processing. Moreover, with the current GRAS status of β-cyclodextrin, and the pending GRAS approval of phospholipase $A_2$ from microbial sources (Tarantino, 2007), the method described herein is sustainable, operationally efficient, and financially efficient. In short, the method vastly improves the flavor profile of proteins at very minimal cost.

Accordingly, one version of the invention is directed to a method for removing compounds that cause off-flavors in proteins. The method comprises contacting a protein-containing solution with a cyclodextrin for a time and under conditions wherein the cyclodextrin binds to off-flavor-causing compounds in the solution, thereby yielding cyclodextrin-compound complexes. The cyclodextrin-compound complexes are then separated from the protein-containing solution. The separation can be accomplished by any separation technology know known or developed in the future, including (by way of illustration and not limitation), filtration, ultrafiltration, dialysis, diafiltration, and precipitation.

The protein-containing solution preferably includes protein derived from oilseeds or oil-bearing cereal grain such as soy-derived proteins. However, the method may be performed with protein derived from any source, without limitation, including plant-, animal-, or micro-organism-derived proteins.

It is also preferred that the protein-containing solution is contacted with an unsubstituted or substituted β-cyclodextrin. The β-cyclodextrin may be immobilized on a solid support.

The protein-containing solution may be contacted with the cyclodextrin alone or in combination with a sonicating step and/or an enzyme treatment step using a lipid hydrolase such as a phospholipase, including a phospholipase $A_2$.

The off-flavor-causing compound may include or consist of a lipid that contains a fatty acid moiety. The off-flavor-causing compound may more specifically be selected from the group consisting of a free fatty acid, a phospholipids, a glyceride, and a cholesterol ester.

In a specific version of the invention, the protein-containing solution is sonicated for at least about 2 minutes, such as 5 minutes, at a temperature of from about 20° C. to about 70° C., at a frequency of from about 10 kHz to about 30 kHz, and at a power of from about 30 W to about 100 W. Values above and below these ranges are explicitly included within the scope of the method. The protein-containing solution is preferably treated with a phospholipase $A_2$, at a temperature of from about 20° C. to about 50° C., and at a concentration of from about 50 units to about 200 units phospholipase $A_2$ per gram of protein in the protein-containing solution.

Another version of the invention is directed to a protein product produced according to any of the methods described herein. The protein product is preferably edible, includes soy protein, has a phospholipid content less than about 10 mg phospholipids/g protein, such as about 1 mg phospholipids/g protein, and a free fatty acid content less than about 10 mg free fatty acid/g protein, such as about 1 mg free fatty acid/g protein.

The objects and advantages of the invention will appear more fully from the following detailed description of the preferred embodiment of the invention made in conjunction with the accompanying drawings.

DETAILED DESCRIPTION OF THE INVENTION

Definitions

Figure 1:
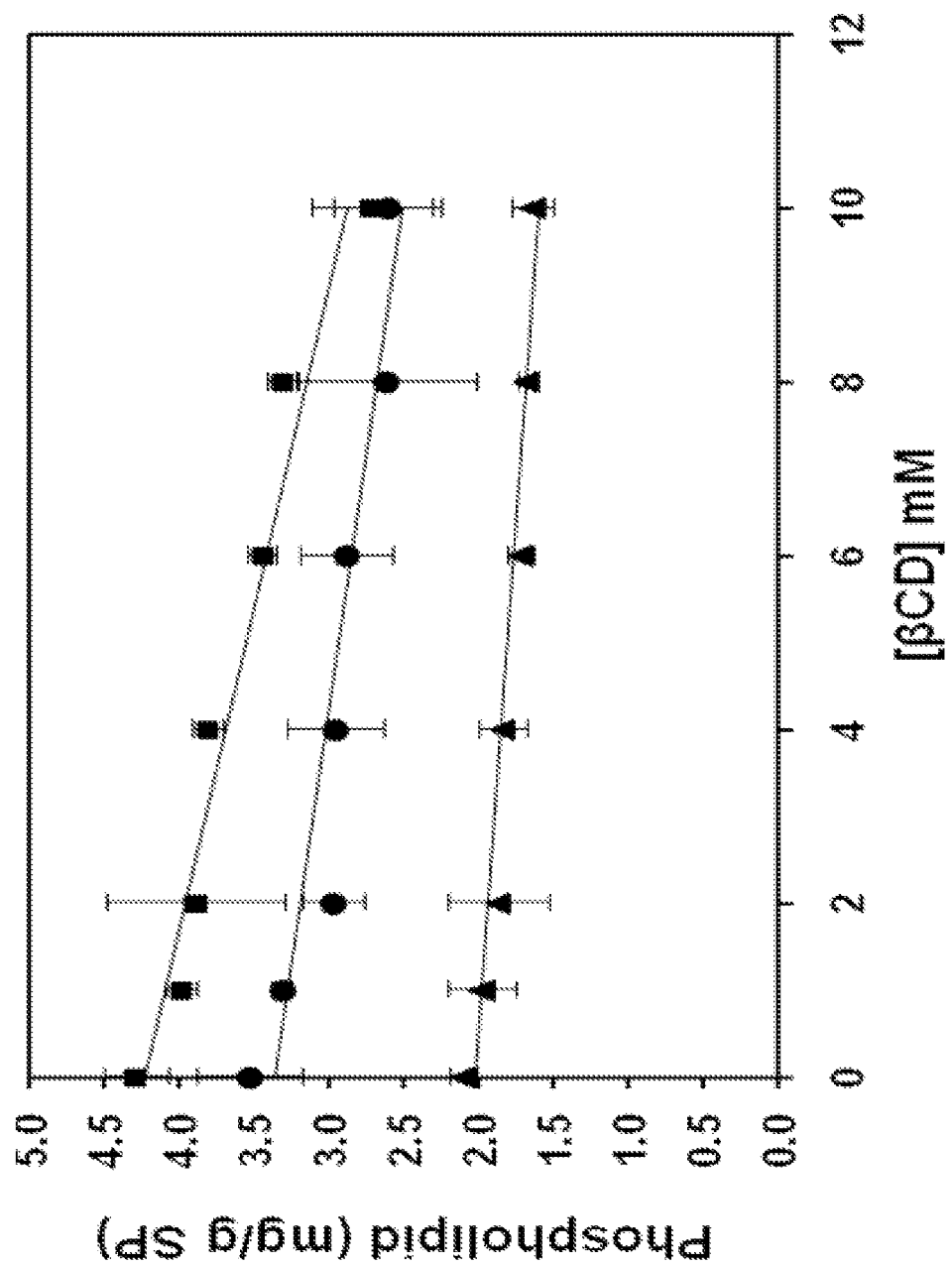
FIG. 1 is a graph depicting phospholipid removal from soy protein (SP) as a function of β-cyclodextrin (βCD) concentration at pH 2.5 (●), pH 8.0 (■), and pH 11.0 (▲).

Cyclodextrin: As used herein, the unmodified phrase "cyclodextrin" denotes a cyclic oligosaccharide composed of five or more α-D-glucopyranoside units joined by α-1,4 linkages, wherein one or more of the hydroxyl groups of the glucopyranoside units may be substituted, without limitation. Expressly included within this definition are unsubstituted and substituted α-cyclodextrins (six saccharides in the ring), β-cyclodextrins (seven saccharides in the ring), and γ-cyclodextrins (eight saccharides in the ring). Substituents that may appear on the cyclodextrin include but are not limited to alkyl; hydroxyalkyl; carboxyl; carboxyalkyl; acyl; alkylacyl; saccharyls such as glucosyl, maltosyl and maltotriosyl; sulfonyl; phosphoryl; nitryl; ammonyl; hydroxypropyl; hydroxyethyl; etc. Examples of substituted cyclodextrins include but are not limited to methyl-β-cyclodextrin, ethyl-β-cyclodextrin, and hydroxypropyl-β-cyclodextrin. Further examples include the substituted cyclodextrins described by U.S. Pat. Nos. 5,096,893; 5,173,481; 5,241,059; 5,472,954; and 6,045,812. The cyclodextrin may be free in solution or immobilized on a solid support such as silica particles, polyurethane particles, or other solid phase supports known in the art. Cyclodextrins are commercially available from a host of suppliers, including CTD, Inc. (High Springs, Fla.) and Cargill, Inc. (Minneapolis, Minn.).

Lipid Hydrolase: As used herein, "lipid hydrolase" denotes any enzyme that hydrolyzes lipids such as phospholipids, glycerides, and cholesterol esters to release fatty acids or other lipophilic substances. Examples of lipid hydrolases include phospholipases, the latter of which include but are not limited to phospholipase A1, A2, B, C, and D. As used herein, the unmodified phrase "phospholipase" denotes any enzyme that hydrolyzes phospholipids into fatty acids and other lipophilic substances, including (without limitation) phospholipase $A_1$, $A_2$, B, C, and D, and any enzyme falling within enzyme classification nos. EC 3.1.1.3; EC 3.1.1.4; EC 3.1.1.23; EC 3.1.1.26; EC 3.1.1.32; EC 3.1.1.34; EC 3.1.4.3; and EC 3.1.4.4. Phospholipases are commercially available from a host of commercial suppliers, including Sigma-Aldrich (St. Louis, Mo.) and Worthington Biomedical Corporation (Lakewood, N.J.). Lipid hydrolases also include but are not limited to any enzyme falling within enzyme classification nos. EC 3.1.1.3 (includes lipase); EC 3.1.1.4 (includes phospholipase A2); EC 3.1.1.23 (includes acylglycerol hydrolase); EC 3.1.1.26 (includes galactolipase); EC 3.1.1.32 (includes phospholipase A1); EC 3.1.1.34 (includes lipoprotein lipase); EC 3.1.4.3 (includes phospholipase C); EC 3.1.4.4 (includes phospholipase D), and EC 3.1.1.13 (includes cholesterol esterase). Lipid hydrolases are commercially available from a host of commercial suppliers, including Sigma-Aldrich (St. Louis, Mo.) and Worthington Biomedical Corporation (Lakewood, N.J.). Some versions of the invention include using specific lipid hydrolases, such as phospholipases, at specific unit activities. Unit definitions for phospholipases are well known in the art. Nevertheless, several unit definitions of exemplary phospholipases are provided as follows. One unit of phospholipase A2 hydrolyzes 1.0 μmole of L-α-phosphatidylcholine to L-α-lysophosphatidylcholine and a fatty acid per minute at pH 8.0 at 37° C. One unit of phospholipase C liberates 1.0 micromole of water soluble organic phosphorus from L-α-phosphatidylcholine per minute at pH 7.3 at 37° C. One unit of phospholipase D liberates 1.0 μmole of choline from L-α-phosphatidylcholine (egg yolk) per hour at pH 5.6 at 30° C. One unit of lipase (EC 3.1.1.3) hydrolyzes 1.0 microequivalent of fatty acid from a triglyceride in one hour at pH 7.2 at 37° C.

Protein or Protein-Containing Solution: As used herein, these terms denote protein derived from any source, without limitation. A "protein-containing solution" may also comprise any number of other ingredients, known or unknown. Included in the terms "protein" or "protein-containing solution" are proteins derived from oilseeds or oil-bearing cereal grain, which include but are not limited to those derived from cottonseed, peanut, rapeseed, flaxseed, linseed, canola, rice bran, soybean, sunflower seed, copra, palm kernel, wheat, corn, barley, oats, dry beans, peas, and lentils.

Off-Flavor-Causing Compound: As used herein, "off-flavor-causing compound" refers to any compound that causes off flavors and/or metabolizes into other compounds that cause off flavors. Non-limiting, exemplary off-flavor-causing compounds include small molecular weight phytochemicals. Other non-limiting, exemplary off-flavor-causing compounds include lipids that contain a fatty acid moiety such as free fatty acids; phospholipids, including lysophospholipids and other phospholipids; glycerides, including triglycerides, diglycerides, and monoglycerides; and cholesterol esters as well as the hydrolyzed byproducts of these lipids. The fatty acid moieties in these lipids, such as polyunsaturated fatty acid moieties, oxidize to contribute to off-flavors. Phospholipids, glycerides, and cholesterol esters are each capable of being hydrolyzed by at least one of the lipid hydrolases as defined and described herein. Furthermore, these lipids and their hydrolytic byproducts, including free fatty acids and lysophospholipids, are capable of binding to cyclodextrins as defined and described herein.

Separation: The method described herein includes a step of separating cyclodextrin-containing complexes from a protein-containing solution. "Separation" is used herein synonymously with "removal." The proteins in the protein-containing solution can be substantially removed from the remaining components of the protein-containing solution. Alternatively, the cyclodextrin can be substantially removed from the remaining components of the protein-containing solution. Such separation can be accomplished by any means now known or developed in the future, without limitation. Two exemplary separation methods include diafiltration and isoelectric precipitation. Diafiltration is a membrane based separation that is used to reduce, remove, or exchange salts and other small molecule contaminants from a process liquid or dispersion. In batch diafiltration, the process fluid is typically diluted by a factor of two using "clean" liquid and brought back to the original concentration by filtration. This process is repeated several times to achieve the desired minimal contaminant concentration. In continuous diafiltration, the "clean" liquid is added at the same rate as the permeate flow. Isoelectric precipitation is the precipitation of materials such as proteins at their isoelectric point. The isoelectric point (pI) is the pH at which the net charge of a protein is zero. When proteins are in a solution at a pH of the proteins' pI, repulsive electrostatic forces are reduced and dispersive forces predominate, causing aggregation and precipitation.

The elements and method steps described herein can be used in any combination whether explicitly described or not.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All references to singular characteristics or limitations of the present invention shall include the corresponding plural characteristic or limitation, and vice-versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

All patents, patent publications, and non-patent literature (i.e., "references") cited herein are expressly incorporated by reference to the same extent as if each individual reference were specifically and individually indicated as being incorporated by reference. In case of conflict between the present disclosure and the incorporated references, the present disclosure controls.

The methods of the present invention can comprise, consist of, or consist essentially of the essential elements and limitations of the method described herein, as well as any additional or optional ingredients, components, or limitations described herein or otherwise useful in the art.

Versions of the Invention

At the heart of the present invention is the elucidation that cyclodextrins in general, and β-cyclodextrins in particular, bind to phospholipids and other off-flavor-causing compounds bound to proteins. The cyclodextrin-containing complexes can then be separated from the protein. The result is a protein product that is substantially devoid of phospholipids and/or other off-flavor-causing compounds, and which has no off-flavors, such as a beany or grassy flavor.

Thus, in its most simple embodiment, the method comprises contacting a protein-containing solution with cyclodextrin for a period of time so that the cyclodextrin can complex with off-flavor-causing compounds found in the protein-containing solution. The cyclodextrin-compound complexes are then separated from the protein-containing solution, thereby yielding a protein solution that has reduced off-flavor-causing compound content, and thus reduced off-flavors. Generally, the solution should be treated with the cyclodextrin for a period of hours to days, e.g., from about 0.5 hours to about 72 hours. For sake of economic efficiency, a time period of from about 1 hour to about 12 hours is preferred. The treatment step preferably takes place at room temperature (~20° C.), but can also be performed at temperatures above or below room temperature.

The concentration of soy protein treated with cyclodextrin is preferably within a range of from about 1 mg/ml to about 100 mg/ml, more preferably of from about 25 mg/ml to about 75 mg/ml, and most preferably at a concentration of about 50 mg/ml.

The pH of the soy protein solution during cyclodextrin treatment is preferably within a range of from about 2 to about 11, more preferably of from about 6 to about 8, and most preferably of from about 7 to about 8. pHs above or below this range are within the scope of the claims attached hereto, but are not preferred. The protein-containing solution is preferably a hydrophilic solution.

The cyclodextrin is added to the protein-containing solution so that the final concentration of cyclodextrin in the solution is from about 0.1 mM to about 50 mM, more preferably from about 1 mM to about 10 mM. Specific concentrations within these ranges are provided in the examples below. Concentrations above and below these ranges are explicitly included within the scope of the claims. Any cyclodextrin falling within the definition provided above is acceptable. A β-cyclodextrin is preferred. Mixtures of two or more types of cyclodextrins may be used.

The basic embodiment of the invention (i.e., treating a protein-containing solution with a cyclodextrin), while functional, does not result in maximum reduction in off-flavor-causing compound content in the treated protein. Therefore, in the preferred version of the invention, the protein-containing solution is sonicated and/or treated with a lipid hydrolase, such as a phospholipase, prior to being contacted with the cyclodextrin. As noted in the examples, it is thought that sonication helps to dissociate the phospholipids and other off-flavor-causing compounds from the protein molecules and to provide the phospholipids in a structure amenable to lipid hydrolase digestion. Digestion with a lipid hydrolase is thought to render the off-flavor-causing compounds more amenable to complexation by the cyclodextrin.

Sonication is preferably performed at about room temperature or slightly elevated temperatures, preferably from about 20° C. to about 80° C., more preferably from about 30° C. to about 70° C., even more preferably from about 40° C. to about 60° C., and most preferably at about 50° C. Sonication is preferably performed at a frequency from about 15 kHz to about 25 kHz, such as about 20 kHz, and at a power of from about 30 W to about 100 W. The sonication is preferably performed for a time of from about 1 minute to about 10 minutes, more preferably of from about 2 minutes to about 7 minutes, and most preferably of about 5 minutes. Sonication using parameters above and below these preferred ranges is within the scope of the invention.

The protein-containing solution is preferably treated with a lipid hydrolase at a concentration of from about 50 to about 1000 units/gram protein, more preferably at a concentration from about 100 to about 700 units/gram protein, and most preferably at a concentration of about 120 units/gram protein. Any lipid hydrolase falling within the definition provided above is acceptable. A phospholipase, such as phospholipase $A_2$, is preferred. The treatment should proceed at room temperature or at slightly elevated temperatures, generally from about 20° C. to about 50° C. Note that the optimum temperature of the enzyme treatment step is dependent upon the specific lipid hydrolase(s) chosen for the treatment, and can be determined empirically by running several digestions in parallel at different temperatures, thereby to determine the optimal temperature for any given enzyme or combination of enzymes. Incubation times may fall within the range of from 0.1 to 72 hours, and preferably of from 1 to 24 hours. Specific versions of the invention employ an incubation time of about 3 hours.

After sonication and enzyme digestion, treating the protein-containing solution with cyclodextrin proceeds as described above.

The separation of the cyclodextrin from the protein-containing solution can occur by any method known or discovered in the art. Three non-limiting examples include ultrafiltration, precipitation, and dialysis. When a cyclodextrin immobilized on a solid phase is used, the separation can also occur by centrifugation of the protein-containing solution followed by collection of the protein-containing supernatant.

Separation by ultrafiltration is preferably performed with diafiltration. The diafiltration can be performed either in batch or continuous mode and is preferably performed with a diafiltration ratio of from about 1× to about 10× the original volume, and more preferably at least about 4× the original volume. The diafiltration may be carried out with any diluent. Preferred diluents include deionized water. The deionized water may additionally contain an amount of β-cyclodextrin. The amount of β-cyclodextrin preferably ranges from about 0.1 to about 20 mM, and more preferably ranges from about 1 to about 10 mM. A specific, preferred amount is about 10 mM.

Separation by precipitation preferably occurs by precipitating the protein from the protein-containing solution, and thereby from the β-cyclodextrin-phospholipid complexes. Many methods of protein precipitation are known in the art, including salting out, isoelectric precipitation, precipitation with organic solvents, precipitation with non-ionic hydrophilic polymers, flocculation by polyelectrolytes, etc. Isoelectric precipitation is preferred. Isoelectric precipitation is preferably performed at a pH ranging from about 3 to about 6, more preferably from about 4 to about 5, and most preferably at about 4.5.

The methods described herein are capable of reducing phospholipid content of protein-containing solutions by at least about 22-36%, and, in specific versions, are capable of reducing phospholipid content by at least about 70%, 80%, 85%, 90%, 95%, 97%, 99% or more.

The methods described herein are capable of reducing free fatty acid content of protein-containing solutions by at least about 70%, 80%, 85%, 90%, 95%, 97%, 99% or more.

The present invention also includes protein products, such as a protein product obtained from the methods described herein. The protein product is preferably derived from oilseeds or oil-bearing grain, and more preferably a soy protein product derived from soy.

The protein product may contain a phospholipid content less than about 10 mg phospholipid/g protein, 5 mg phospholipid/g protein, 2.5 mg phospholipid/g protein, 1 mg phospholipid/g protein, 0.75 mg phospholipid/g protein, 0.5 mg phospholipid/g protein, 0.25 mg phospholipid/g protein, 0.1 mg phospholipid/g protein, 0.075 mg phospholipid/g protein, or 0.05 mg phospholipid/g protein.

The protein product may contain a free fatty acid content less than about 10 mg free fatty acid/g protein, 5 mg free fatty acid/g protein, 2.5 mg free fatty acid/g protein, 1 mg free fatty acid/g protein, 0.75 mg free fatty acid/g protein, 0.5 mg free fatty acid/g protein, or 0.25 mg free fatty acid/g protein.

The protein product is capable of being stored for a time period up to 50, 75, 100, 125, 150, 170, or 180 days before volatile compounds in the product reach their odor threshold. Odor thresholds in ppm for volatile compounds, including those described in the examples, are well known in the art.

The protein product is preferably edible. As used herein, "edible" means that the protein product does not contain contaminants or additives that cause adverse affects, such as toxic effects, in an animal when the protein product is consumed in quantities such as about 0.01, 0.05, 0.1, 0.25, 0.5, 0.75, 1, 1.25, 1.5, 1.75, 2, 2.5, or 5 g protein product/kg body weight/day.

It is understood that the invention is not confined to the particular construction and arrangement of parts herein illustrated and described, but embraces such modified forms thereof as come within the scope of the claims.

EXAMPLES

The following examples are provided solely to illustrate with greater clarity the method recited and claimed herein. The examples do not limit the scope of the method in any fashion. The examples specifically show the effect of sonication, phospholipase $A_2$ digestion, and β-cyclodextrin treatment on phospholipid and free fatty acid removal. Other cyclodextrins and lipid hydrolases are predicted to have similar effects on removal of other off-flavor-causing compounds.

Materials and Methods
Reagents:

Soy protein was isolated from defatted soy flour (ADM Co., Decatur, Ill.) as previously described (Damodaran and Kinsella, 1981), but without using β-mercaptoethanol. Food grade β-cyclodextrin ("CAVITRON 82800"-brand) was donated by Cargill Inc. (Minneapolis, Minn.). Deuterated chloroform (d-CHCl$_3$), triethyl phosphate (TEP), and phospholipase $A_2$ from porcine pancreas with a stated activity of >10,000 units/ml were purchased from Sigma-Aldrich Corp. (St. Louis, Mo.). Fatty acids methyl ester standard (GLC-15A) and heptadecanoic methyl ester were obtained from Nu-Chek Prep, Inc. (Elysian, Minn.). Deionized water from a Milli-Q ultrapure water system (Millipore Corp., Bedford, Mass.) with a resistivity of 18.2 MΩ-cm was used in all experiments. All other chemicals used were of reagent grade.

Treatment of Soy Protein with β-Cyclodextrin:

Aliquots of soy protein dispersion and β-cyclodextrin stock solution were mixed in 15-mL conical centrifuge tubes (BD Biosciences, Franklin Lakes, N.J.) and diluted with an appropriate volume of pH-adjusted buffer to achieve final concentrations of 50 mg/mL soy protein and 0 to 10 mM β-cyclodextrin. The solutions were equilibrated on a tube rocker for 30 min at 25° C. Control and β-cyclodextrin-treated soy protein was recovered from the equilibrated samples by isoelectric precipitation at pH 4.5 followed by centrifugation at 1744×g for 5 min. Precipitate was washed 3× with deionized water at pH 4.5 for maximum removal of β-cyclodextrin and subsequently used for phospholipid assay. All samples were run at least in triplicate. Protein content was determined by Biuret assay using bovine serum albumin as reference (Layne, 1957).

Treatment of Soy Protein with Phospholipase $A_2$ and β-Cyclodextrin:

A working solution of phospholipase $A_2$ (100 units/mL) was prepared in 10 mM TRIS-HCl buffer (pH 8.0, 10 mM CaCl$_2$, 100 mM NaCl). The phospholipase $A_2$ used in this study did not show any proteolytic activity as measured by the method of Han and Damodaran (1998). Soy protein dispersion (70 mg/mL) was prepared in 10 mM TRIS-HCl buffer (pH 8.0, 1 mM CaCl$_2$). CaCl$_2$ was included in solution as a cofactor for phospholipase $A_2$ activity (Yu et al. 1993). Soy protein dispersion (50 mL) was sonicated in a temperature-controlled vessel at 50° C. for 2 to 5 mM using a microtip horn attached to a "SONIFIER"-brand cell disruptor (Model 450, Branson Ultrasonics Corp., Danbury, Conn.). An energy input of 65 W (setting 5 on the sonifier) was maintained for all the samples. The SONIFIER cell disruptor operates at a frequency of 20 kHz. The 50° C. temperature was chosen for sonication to ensure that phospholipids were in a fluid state (Wolfe, 1993) so that the phospholipids could be dissociated from the oleosin-phospholipid complex and potentially transformed into a lipid bilayer or micelle state. Immediately after sonication, phospholipase $A_2$ was added to the soy protein dispersion at a level of 121-609 units/g soy protein. Enzymatic hydrolysis was carried out in a temperature-controlled water bath at 37° C. for 30 to 180 mM with constant stirring. An untreated control was maintained throughout all the experiments. After hydrolysis, samples were cooled to room temperature by cooling on ice followed by addition of β-cyclodextrin. These samples were diluted immediately with deionized water (pH 8.0) to achieve final soy protein and β-cyclodextrin concentrations of 50 mg/mL and 8 mM, respectively, and mixed thoroughly using an overhead stirrer for 30-60 min. After the treatment, the protein was precipitated at pH 4.5. The precipitate was washed thrice with deionized water (pH 4.5), and the final, washed precipitate was used directly for phospholipid analysis.

Large-scale processing of soy protein isolate solution was carried out as follows: 4 L of soy protein isolate solution (80 mg/mL), prepared in deionized water (pH 8, 1 mM CaCl$_2$), was sonicated (power=65 W) in 200-mL aliquots at 50° C. for 5 min. The sonicated aliquots were combined, cooled to 37° C., and mixed with phospholipase $A_2$ (121 units/g soy protein isolate). Enzymatic lipolysis was carried out at 37° C. for up to 3 h with gentle stirring. The solution was cooled to 25° C. and mixed with an appropriate volume of deionized water (pH 8.0) containing a calculated amount of β-cyclodextrin so that the final concentration of soy protein isolate and β-cyclodextrin in the solution was 30 mg/mL and 10 mM, respectively. (Dilution of the soy protein isolate solution from 80 mg/mL to 30 mg/mL was necessary in order to reduce the viscosity for efficient diafiltration of the solution). The solution was stirred using an overhead stirrer for one hour and then ultrafiltered using a spiral wound membrane (MWCO=10 kDa) to a final retentate volume of 5 L. Thereafter, the retentate was diafiltered using 20 L of deionized water (pH 8.0) to remove both free β-cyclodextrin and β-cyclodextrin-phospholipid inclusion complexes. Finally, the soy protein isolate retentate (5 L) was spray dried and stored in air-tight glass jars at −20° C. A control soy protein isolate was also prepared under similar conditions but without sonication, phospholipase $A_2$, and β-cyclodextrin treatments.

Large-scale processing was also carried out as described above except that 5 L of soy protein solution was used. See FIG. 4. After treatment, the soy protein was separated from β-cyclodextrin-treated solution either by isoelectric precipitation at pH 4.5 or by ultrafiltration. Soy protein obtained by isoelectric precipitation was washed 3× with deionized water (pH 4.5) and used directly for phospholipid analysis. Soy protein obtained by ultrafiltration was diafiltered up to 5× the original volume using a spiral bound membrane (nominal molecular weight cut-off=10 kDa) in a continuous diafiltration mode using deionized water (pH 8.0). Filtrate containing β-cyclodextrin and β-cyclodextrin-phospholipid complex was discarded while the retentate containing soy protein was either spray-dried or lyophilized and stored at −20° C.

Phospholipid Assay:

Residual phospholipids from ~50 mg soy protein precipitates were extracted 3× by adding 5 mL of 1:2 (v/v) $CHCl_3$:$CH_3OH$ (Lee et al. 1996) and sonicating for 20 min each time. Solvent was separated from precipitates by centrifugation at 1744×g for 5 min and decanting the supernatant into a 50-mL centrifuge tube (BD Biosciences, Franklin Lakes, N.J.). Twenty mL of 0.5% NaCl was added to the solvent extract, vortexed for 30 sec, and stored overnight at refrigeration temperature to allow the solvent to become biphasic. The upper aqueous phase containing $CH_3OH$ was discarded. The lower $CHCl_3$ phase containing lipids was recovered into a glass test tube. The $CHCl_3$ extract was dried under nitrogen at 37° C. and digested with 100 ml of 10.4 $NH_2SO_4$ and 50 μL of 30% $H_2O_2$ at 155° C. for 40 min to release inorganic phosphate, which was quantified by phosphomolybdate assay at 797 nm (Anderson and Davis, 1982). Using a $Na_2HPO_4$ calibration curve (not shown) and an average molecular weight of 750 g/mol for soy phospholipid (Lendrath, 1990) and 94.973 g/mol for phosphate ($PO_4^{3-}$), phospholipid content (mg/g soy protein) of soy protein was estimated. All measurements were performed in triplicate.

Analysis of Free Fatty Acids:

Lipids were extracted from 1 g soy protein isolate by adding 33 mL of 2:1 (v/v) $CHCl_3$:$CH_3OH$ and homogenizing with PT-2100 homogenizer (Kinematica AG, Lucerne, Switzerland) at 11,000 rpm for 30 sec. The lipid extract was filtered with Whatman No. 40 filter paper, dried under nitrogen at 37° C., and converted to fatty acid methyl esters either by acid-catalyzed or base-catalyzed transesterification as described by Li and Watkins (2005). Since acid-catalyzed transesterification converts both acylglycerols and free fatty acids into fatty acid methyl esters and base-catalyzed transesterification converts only acylglycerols into fatty acid methyl esters (Shantha and Napolitano, 1992), the difference in fatty acid methyl esters produced by both methods was used to calculate the amount of free fatty acid present in soy protein isolate.

Briefly, acid-catalyzed transesterification was performed by saponifying the dry lipid extract obtained from the previous step with 0.4 mL of 0.5 N NaOH at 100° C. for 5 min, followed by methylation with 0.4 mL boron trifluoride ($BF_3$) in 12% methanol at 100° C. for 5 min. Fatty acid methyl esters thus produced were dissolved in 500 μL hexane containing heptadecanoic methyl ester (5 μg/μL) as an internal standard, mixed with 8.5 mL of deionized water, and centrifuged at 1000×g for 5 min to separate organic and aqueous phases. Three hundred microliters of the upper hexane layer containing fatty acid methyl ester was recovered and placed in a 500-μL glass insert containing a 1-mm-deep layer of anhydrous sodium sulfate. Glass inserts were housed inside 1.5-mL GC vials and closed tightly with caps lined with Teflon septa. Subsequently, samples were subjected to gas-liquid chromatography as described later in this section.

Base-catalyzed transesterification was carried out by dissolving the dried lipids in 1 mL dry toluene and 2 mL of 0.5 N sodium methoxide (in methanol) at 50° C. for 10 min. After cooling the tubes, 0.1 mL of glacial acetic acid, 5 mL saturated NaCl, and 3 mL hexane was added to samples in that order. The samples were thoroughly mixed and centrifuged at 1000×g for 5 min. The upper hexane layer, containing fatty acid methyl ester, was recovered and transferred to a glass test tube containing a ~1-mm-deep layer of anhydrous sodium sulfate. A second extraction of lower aqueous phase was carried out with 3 mL hexane to remove residual fatty acid methyl esters. This extract was pooled with hexane extract obtained previously and dried under nitrogen at 40° C. Dried fatty acid methyl esters were reconstituted in 500 μL hexane containing heptadecanoic methyl ester (5 μg/μL) as an internal standard, out of which 300 μL was recovered, sealed in glass inserts, and used for gas-liquid chromatography analysis.

A Hewlett-Packard model 6890 gas chromatograph (Hewlett-Packard, Palo Alto, Calif.) equipped with Restek RTX-5MS capillary column (30 m×0.25 mm, 0.50-μm thickness) (Restek Inc., Bellefonte, Pa.) and an Agilent 5973 mass spectrometer (Agilent Technologies Inc., Santa Clara, Calif.) were used to quantify fatty acid methyl ester content. Briefly, 1 μL of hexane extract obtained by either acid-catalyzed or base-catalyzed transesterification was injected at 250° C. and carried through the column in a constant flow mode. The oven temperature was held at 50° C. for 1 min, increased at the rate of 30° C./min up to 150° C., followed by a temperature increase of 5° C./min up to 250° C., and finally held at 250° C. for 5 min. Retention time of fatty acid methyl esters in samples was identified using mass spectrometry of a standard mixture containing C16:0 to C20:0 fatty acid methyl esters. Quantification of fatty acid methyl esters was done by integrating their peak areas and normalizing with respect to peak area of known amount of the internal standard heptadecanoic methyl ester.

Accelerated Storage of Soy Protein:

Both control and treated soy protein isolates prepared by the large-scale process were stored at 40° C. for 90 days in tightly closed glass containers to promote accelerated oxidation of residual polyunsaturated fatty acid (Lin and Blank, 2003; Taoukis et al., 1997) and formation of volatile compounds. These soy protein isolate samples were compared with their counterparts stored at −20° C. for volatile content.

Analysis of Headspace Volatiles by Gas Chromatography-Mass Spectrometry:

Aroma volatiles in soy protein isolate were analyzed by headspace gas chromatography-mass spectrometry analysis using the solid-phase microextraction technique. In a typical experiment, 10 mL of soy protein isolate solution (100 mg/mL), prepared in deionized water at pH 7.0, was introduced into a 35-mL headspace vial stoppered with a Teflon septum. The vial was immersed in a water bath maintained at 40° C. and stirred using a magnetic stir bar. Then, a solid-phase microextraction syringe needle was introduced into the vial, and the solid-phase microextraction fiber (50/30 μm DVB/Carboxen/PDMS, Supelco, Bellefonte, Pa.) was exposed to headspace for 40 mM. Volatiles were desorbed from the solid-phase microextraction fiber at 200° C. for 5 mM in the injection inlet of Hewlett-Packard HP6890 series gas chromatograph (Hewlett-Packard, Palo Alto, Calif.) and separated on Restek RTX-5MS capillary column (30 m×0.25 mm, 0.5 μm thickness) (Restek Inc., Bellefonte, Pa.) using helium as carrier gas at a constant flow rate of 0.9 mL/min. During each sample analysis, gas chromatography oven temperature was maintained at 40° C. for 2 mM, increased from 40 to 150° C. at a rate of 6° C./min and from 150 to 220° C. at a rate of 8° C./min. Volatiles eluting from the column were routed to an Agilent 5973 mass spectrometer (Agilent Technologies, Inc., Santa Clara, Calif.) and identified using NIST 98 mass spectral library, version 1.7 (National Institute of Standards and Technology, Gaithersburg, Md.). Operating conditions for mass spectrometry were: ion source temperature of 230° C., electric multiplier tube (EMT) voltage of 2752.9 V, and mass scan range of m/z=36-250 atomic mass units at the rate of 2.76 scans/min. Quantification of volatiles was done by comparing their peak areas from total ion chromatogram to an internal standard, ethyl pentanoate. The results were expressed as means of at least three replicates.

Determination of Residual β-Cyclodextrin in Soy Protein:

Residual β-cyclodextrin concentration in treated soy protein was determined by a colorimetric assay (Smith et al. 1995). Briefly, 0.25 mL of soy protein dispersion (10 mg/mL) was mixed with 1.75 mL of 6 mM phenolphthalein solution in 1 M $NaHCO_3$ (pH 10.5) and measured for its absorbance at 546 nm. The amount of β-cyclodextrin in soy protein samples was determined according to a calibration curve (not shown) prepared using 0 to 1% (w/v) β-cyclodextrin in distilled water.

$^{31}$P-NMR Spectroscopy:

Precipitates from control and treated soy protein samples were extracted 3× with 15 mL of 1:2 (v/v) $CHCl_3:CH_3OH$. EDTA (25 mL, 0.2 M, pH 10.5) was added to the $CHCl_3$:$CH_3OH$ extract, shaken vigorously, and stored overnight at 5° C. $CHCl_3$ from the phase-separated solvent mixture was collected in conical glass centrifuge tubes and dried under a vacuum at 37° C. The dried matter was reconstituted in 1 mL d-$CHCl_3$ with 47.32 mg/mL triethyl phosphate (TEP) as an internal standard. Aliquots (600 mL) of d-$CHCl_3$ were transferred to 178×5 mm NMR tubes and submitted for analysis to the National Magnetic Resonance Facility at University of Wisconsin-Madison, Wis. $^{31}$P-NMR spectra for samples were recorded at 161.97 MHz and 25° C. using a Bruker DMX 400 WB spectrometer (BrukerBioSpin Corporation, Billerica, Mass.) equipped with a 5 mm $^{31}$P quattro-nucleus probe and controlled by an SGI "IRIX"-brand workstation (SGI, Inc., Fremont, Calif.). Chemical shifts (δ) of phospholipid were expressed as ppm downfield from internal standard TEP (δ=−1.755±0.02 ppm at 25° C.).

Statistical Analysis:

Analysis of variance (ANOVA) was performed to compare mean values of data. The level of significance (α) was set at 5%. All analyses were done using Microsoft® Office Excel® 2007 software (Microsoft Corporation, Redmond, Wash.).

Results

Phospholipid Removal from Soy Protein by β-Cyclodextrin:

Treatment of soy protein with 0 to 10 mM β-cyclodextrin resulted only in moderate reduction in phospholipid levels. As shown in FIG. 1, even at 10 mM β-cyclodextrin concentration, a maximum of 36% phospholipid was removed from soy protein at pH 8.0. (■). This reduction was statistically significant (p<0.05).

While not being bound to any underlying biological mechanism, a likely reason for the lack of complete removal could be that the majority of soy protein-bound phospholipids might be oriented in such a way that they are not accessible for complexation with β-cyclodextrin. In the case of oleosin-phospholipid complexes, not much information is available regarding their structure once they are separated from oil bodies. However, particle size measurements done by Samoto et al. (1998) suggest that these complexes exist as spherical particles 100-200 nm in diameter. Based on this size information, it is hypothesized that after extraction of oil from the soybean oil bodies, the oleosin-phospholipid membrane envelope of the oil body may collapse into liposome/vesicle-type structures, mixed micelles, or bilayer structures. It has been reported that β-cyclodextrin lacks the ability to penetrate liposomes or bilayers and therefore it can extract only limited amount of phospholipid from such structures (Nishijo and Mizuno, 1998; Nishijo et al., 2000; Piel et al. 2007). Complexation of phospholipid could also be influenced by cyclodextrin's ability to interact with the polar headgroup of phospholipid first, followed by pulling the exposed hydrophobic acyl chain of phospholipid into its cavity (Fauvelle et al. 1997). This means phospholipids with polar headgroups such as phosphatidylinositol or phosphatidylserine may be more likely to be easily extracted by β-cyclodextrin as compared to phospholipid with less polar headgroups such as phosphatidylcholine or phosphatidylethanolamine. Finally, it is also likely that binding of the two acyl chains of phospholipids to two β-cyclodextrin molecules might not be sterically favorable, and this may, for thermodynamic reasons, limit the efficiency of extraction of phospholipids by β-cyclodextrin.

β-cyclodextrin treatment was also performed at pH 2.5 (●) and 11.0 (▲), with the results shown in FIG. 1. The rationale behind this approach was that at extreme pH values, the electrostatic interaction between the polar head groups of phospholipid and the charged domains of oleosin could be altered, resulting in weakened oleosin-phospholipid complexes. Therefore, it was hypothesized that removing phospholipid from those complexes by β-cyclodextrin would be easier at high acidity or high alkalinity. The phospholipid contents in both control and treated soy protein at various pH values are shown in FIG. 1. The change in pH did not, however, have notable effect. The pH change did influence the initial phospholipid content of the control. At pH 8.0, the phospholipid level in the control was 4.3 mg/g soy protein, and this value dropped to 3.53 and 2.11 mg/g at pH of 2.5 and 11.0, respectively. This can be explained on the basis of an alteration in the balance of hydrophobic and electrostatic interactions that keep oleosins and phospholipid together in a complex. At pH 2.5, arginine, lysine, and histidine residues of oleosin are positively charged. Among phospholipids, phosphatidylserine and phosphatidylethanolamine are positively charged, phosphatidylinositol and phosphatidic acid are negatively charged, and phosphatidylcholine is neutral at pH 2.5. Therefore, electrostatic repulsion is likely to drive phosphatidylserine and phosphatidylethanolamine out of an oleosin-phospholipid complex while electrostatic attraction retains phosphatidylinositol and phosphatidic acid in the complex. Based on this argument, a net loss of phospholipid is to be expected from the soy protein control at pH 2.5. At pH 11.0, aspartate, glutamate, and tyrosine residues of oleosin are negatively charged. Likewise, most phospholipids are either negatively charged or neutral at pH 11.0. Therefore, net electrostatic repulsion between oleosin and phospholipid molecules can result in loss of phospholipid from the oleosin-phospholipid complex. In addition, under mild alkaline conditions, carboxyl ester groups of phospholipid are susceptible to nucleophilic attack by hydroxyl ions, which can result in hydrolysis of phospholipid into free fatty acids and lysophospholipids (Brockerhoff, 1963). Both free fatty acids and lysophospholipids are more water-soluble than the original phospholipid and hence can be more easily removed during washing of soy protein after β-cyclodextrin treatment. Regardless of selective loss of phospholipid from oleosin-phospholipid complexes at extreme pH, it seems that accessibility of residual phospholipid to β-cyclodextrin did not improve by changing treatment pH.

Phospholipid Removal from Soy Protein by β-Cyclodextrin and Phospholipase $A_2$:

Because only 22-36% phospholipid could be removed from soy protein using 10 mM β-cyclodextrin, the phospholipid remaining in soy protein could still cause considerable off-flavor problems during storage. To maximize removal of soy protein-bound phospholipid, phospholipase $A_2$ was used to pre-treat soy protein before β-cyclodextrin treatment. Phospholipase $A_2$ stereospecifically catalyzes the hydrolysis of the fatty acid ester bond at the sn-2 position of phospholipids to produce free fatty acids and lysophospholipids (Nieuwenhuizen et al. 1974; Six and Dennis, 2000). It was hypothesized that the relatively linear structure of free fatty acids and lysophospholipids, as opposed to the branched structure of phospholipids, might make it possible for free fatty acids and lysophospholipids to form inclusion complexes with β-cyclodextrin more readily than phospholipid. Therefore, by hydrolyzing phospholipid into free fatty acid and lysophospholipid, a maximum reduction in the phospholipid content of soy protein might be achieved by the β-cyclodextrin treatment.

Figure 2:
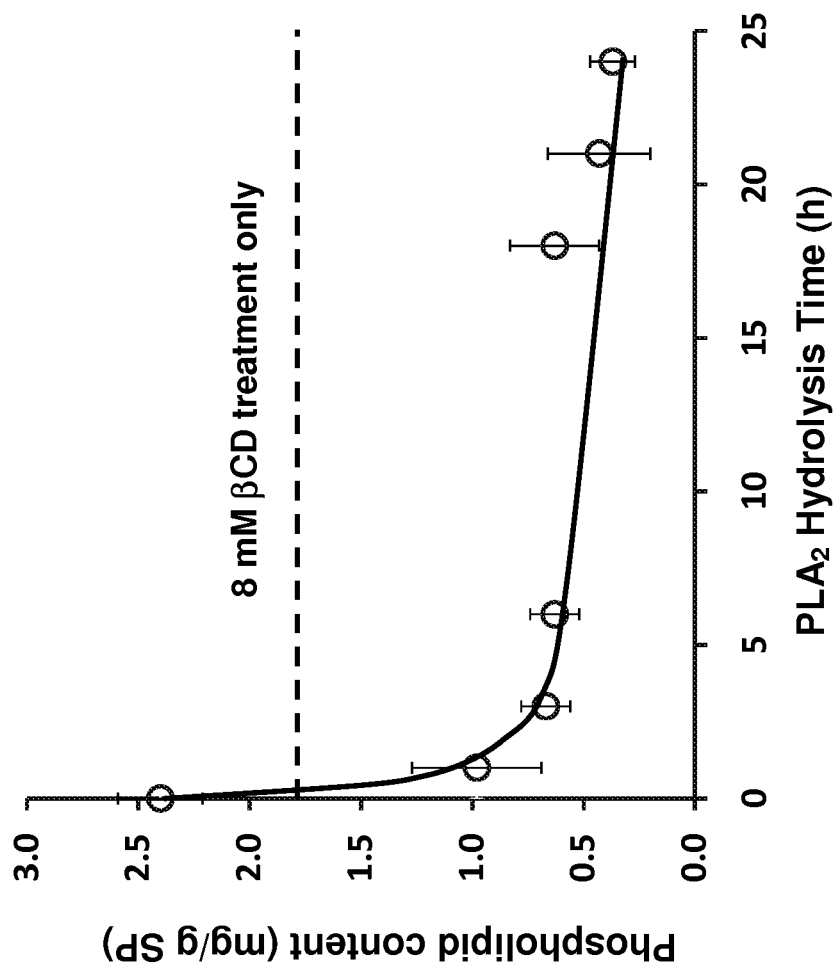
FIG. 2 is a graph depicting phospholipid content (mg/g soy protein (SP)) in soy protein treated with phospholipase $A_2$ ($PLA_2$) (121 units/g soy protein, 37° C., pH 8.0) and 8 mM β-cyclodextrin, and recovered by isoelectric precipitation at pH 4.5. The dotted line represents phospholipid content of soy protein treated only with 8 mM β-cyclodextrin (βCD) at pH 8.0.

FIG. 2 and Table 1 show the results of soy protein treated with phospholipase $A_2$ (121 units/g soy protein) and 8 mM β-cyclodextrin. The combination of treating with phospholipase $A_2$ and β-cyclodextrin was more effective for reducing phospholipid concentration than treating with β-cyclodextrin alone. For instance, when treated with 8 mM β-cyclodextrin alone, only 24.3% of soy protein-bound phospholipid could be removed. In contrast, almost 72% phospholipid removal was achieved within 3 h using a combination of phospholipase $A_2$ digestion and β-cyclodextrin treatments. Eventually, 84.5% of phospholipid was removed from soy protein after 24 hours of hydrolysis with phospholipase $A_2$ (121 units/g soy protein) followed by treatment with 8 mM β-cyclodextrin. Phospholipid reduction of this magnitude in soy protein has not been reported with any other technique other than those involving extraction with polar solvents such as alcohols and acetone.

TABLE 1

Phospholipid content (mg/g soy protein) of soy protein treated with phospholipase $A_2$ (121 units/g) at pH 7.0 and 37° C. and further treated with 8 mM β-cyclodextrin.

| Control A | Control B | Hydrolysis Time (hrs) | | | | | |
|---|---|---|---|---|---|---|---|
| | | 1 | 3 | 6 | 18 | 21 | 24 |
| 2.40 (0.19) | 1.81 (0.88) | 0.98 (0.29) | 0.67 (0.11) | 0.63 (0.11) | 0.63 (0.20) | 0.43 (0.23) | 0.37 (0.10) |

Control A represents soy protein samples without β-cyclodextrin or phospholipase $A_2$ treatment. Control B represents soy protein samples treated with 9 mM β-cyclodextrin only. Values in parentheses represent standard deviation.

However, hydrolysis for longer times beyond 3 hrs did not cause further drastic reduction in phospholipids levels. Even after 24 hrs of digestion, phospholipid could not be completely hydrolyzed by phospholipase $A_2$ and/or removed. It is likely that the oleosin-phospholipid complex was not the most ideal substrate for phospholipase $A_2$ activity. To overcome this inefficiency, a pretreatment step was introduced to change the state of phospholipid in soy protein. Phospholipase $A_2$ hydrolyzes phospholipids faster in a lamellar or micellar structure as compared to phospholipids in monomeric form (Dennis, 1983; Slotboom et al. 1982). That is, phospholipase $A_2$ prefers a lipid-water interface for its activity (Rao and Damodaran, 2004). It was hypothesized that raising the temperature to 50° C., which is above the melting temperature of membrane phospholipids, followed by sonication at that temperature would dissociate phospholipid from the oleosin-phospholipid complex and allow the phospholipids to subsequently assemble into a structure that would provide better access for phospholipase $A_2$. Thus, soy protein samples were sonicated for 2 min at 50° C. before treating with phospholipase $A_2$. The effect of sonication pretreatment on phospholipid reduction is shown in Table 2. Although the exact nature of the effect of sonication on the oleosin-phospholipid complex remains unknown, it is likely that such treatment might facilitate reassembly of phospholipid into a micellar or a lamellar structure.

As shown in Table 2, phospholipid removal by β-cyclodextrin improved significantly ($p<0.05$) in soy protein samples that were first sonicated and then treated with phospholipase $A_2$. More importantly, a 3 h incubation time for phospholipase $A_2$ treatment was sufficient for the sonicated samples to effect maximum removal of phospholipid. The decrease in phospholipid content was almost monotonic with the increase in phospholipase $A_2$ concentration and hydrolysis time. For instance, by using 121 units of phospholipase $A_2$/g soy protein and 8 mM β-cyclodextrin, phospholipid content in soy protein samples sonicated for 2 minutes was reduced from 2.88 mg/g soy protein to 0.26 mg/g soy protein in 3 hrs. This translated to a total reduction of approximately 90%. Similar treatment done using phospholipase $A_2$ concentrations of 267 units/g soy protein and 609 units/g soy protein resulted in complete removal of phospholipid from soy protein within 150 min.

TABLE 2

Effect of phospholipase $A_2$ concentration on phospholipid content (mg/g soy protein) of soy protein sonicated for 2 min and treated with 8 mM β-cyclodextrin at pH 7.0.

| Hydrolysis Time (min) | Control A | Control B | Phospholipase $A_2$ Concentration | | |
|---|---|---|---|---|---|
| | | | 121 units/g soy protein | 267 units/g soy protein | 609 units/g soy protein |
| 0 | 2.88 (0.60) | 1.51 (0.13) | — | — | — |
| 30 | — | — | 1.46 (0.42) | 0.64 (0.03) | 0.13 (0.02) |
| 60 | — | — | 1.13 (0.60) | 0.61 (0.15) | 0.12 (0.01) |
| 90 | — | — | 1.02 (0.34) | 0.45 (0.21) | 0.08 (0.04) |
| 120 | — | — | 0.68 (0.17) | 0.27 (0.11) | 0.08 (0.03) |
| 150 | — | — | 0.40 (0.24) | 0.00 (0.00) | 0.00 (0.00) |
| 180 | — | — | 0.26 (0.13) | 0.00 (0.00) | 0.00 (0.00) |

Control A represents soy protein samples without β-cyclodextrin or phospholipase $A_2$ treatment. Control B represents soy protein samples treated with 8 mM β-cyclodextrin only. Values in parentheses represent standard deviation.

Because sonication dramatically improved phospholipid reduction, the effect of sonication time was further investigated. In this case, sonication time was increased from 2 to 5 min at 65 W while keeping phospholipase $A_2$ concentration constant at 121 units/g soy protein and using β-cyclodextrin concentration in the range of from 0 to 10 mM. As shown in Table 3, soy protein samples sonicated for 5 min prior to phospholipase $A_2$ and β-cyclodextrin treatment had lower phospholipid content as compared to samples sonicated for 2 min. Almost 97% reduction in phospholipid content was achieved with a treatment comprising 5 min sonication, 121 units/g phospholipase $A_2$, and 10 mM β-cyclodextrin.

TABLE 3

Effect of sonication time on the phospholipid content (mg/g soy protein) of soy protein treated with phospholipase $A_2$ (121 units/g soy protein) and β-cyclodextrin (P-CD).

| [β-CD] mM | Control A | Control B | Control C | Sonication Time | |
|---|---|---|---|---|---|
| | | | | 2 min | 5 min |
| 0 | 1.80 (0.07) | 2.01 (0.48) | 1.28 (0.37) | — | — |
| 1 | — | — | — | 0.68 (0.56) | 0.51 (0.16) |
| 2 | — | — | — | 0.54 (0.41) | 0.29 (0.11) |
| 4 | — | — | — | 0.27 (0.01) | 0.13 (0.04) |
| 6 | — | — | — | 0.21 (0.07) | 0.10 (0.05) |
| 8 | — | — | — | 0.18 (0.06) | 0.07 (0.06) |

Control A represents unsonicated soy protein without phospholipase $A_2$ or β-cyclodextrin treatment. Control B represents soy protein sample sonicated for 5 min but without phospholipase $A_2$ or β-cyclodextrin treatment. Control C represents unsonicated soy protein treated only with phospholipase $A_2$ (121 units/g soy protein) and hydrolyzed for 180 min. Values in parentheses represent standard deviation.

Therefore, it appears that the sonication step is an important factor for enhancing phospholipase $A_2$ activity and achieving maximum phospholipid reduction from soy protein. On the basis of these results and those described above, a sonication time of 5 min, hydrolysis by phospholipase $A_2$ (121 units/g soy protein) for 180 min, and a β-cyclodextrin concentration of 10 mM were chosen as optimum parameters for removing phospholipid from soy protein.

Figure 3A:
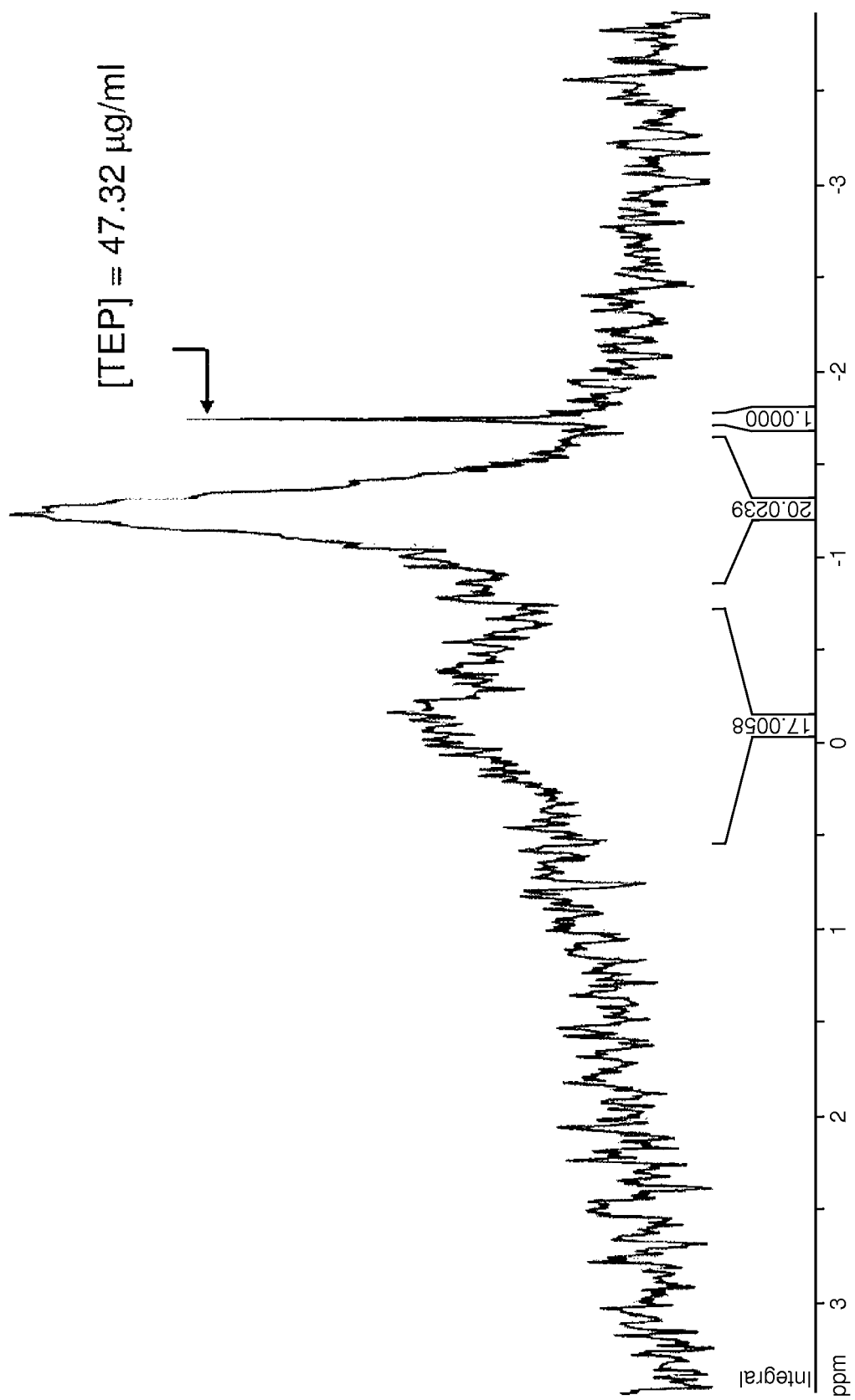
FIG. 3A is a $^{31}$P-NMR spectrum showing phospholipid content of a sonicated soy protein sample treated with phospholipase $A_2$ (121 units phospholipase $A_2$/g soy protein) but not β-cyclodextrin. Triethyl phosphate (TEP) was used as a standard.

$^{31}$P-NMR Spectroscopy:

The previous experiment showed a reduction of phospholipid of greater than 90% from soy protein resulting from sonication, phospholipase $A_2$ treatment, and β-cyclodextrin treatment, with the phospholipid levels being determined by the phosphomolybdate assay. In the present experiment, $^{31}$P-NMR analysis was performed to corroborate the phosphomolybdate assay data. Because $^{31}$P-NMR spectroscopy is specific for the phosphorous atom, it can be used to detect or quantify phospholipids (Meneses and Glonek, 1988; Sotirhos et al. 1986). FIG. 3A is a $^{31}$P-NMR spectrum of sonicated (5 min at 65 W power) soy protein treated with phospholipase $A_2$ (121 units phospholipase $A_2$/g soy protein) but not β-cyclodextrin. The spectrum showed a very broad peak representing all types of phospholipids present in soy protein, e.g., phosphatidylserine, phosphatidylethanolamine, phosphatidylcholine, phosphatidylinositol, etc. The area under the peak spanning the chemical shifts from 0.5 to 1.5 was integrated to determine the total phospholipid content of the sample. It was independently verified that none of the signal peaks was caused by phytic acid, a common phosphorous-containing molecule found in soybean. Using triethyl phosphate (47.32 mg/ml) as an internal standard, it was determined that the area under the phospholipid peaks corresponded to 4.01 mg of phospholipid/g soy protein.

Figure 3B:
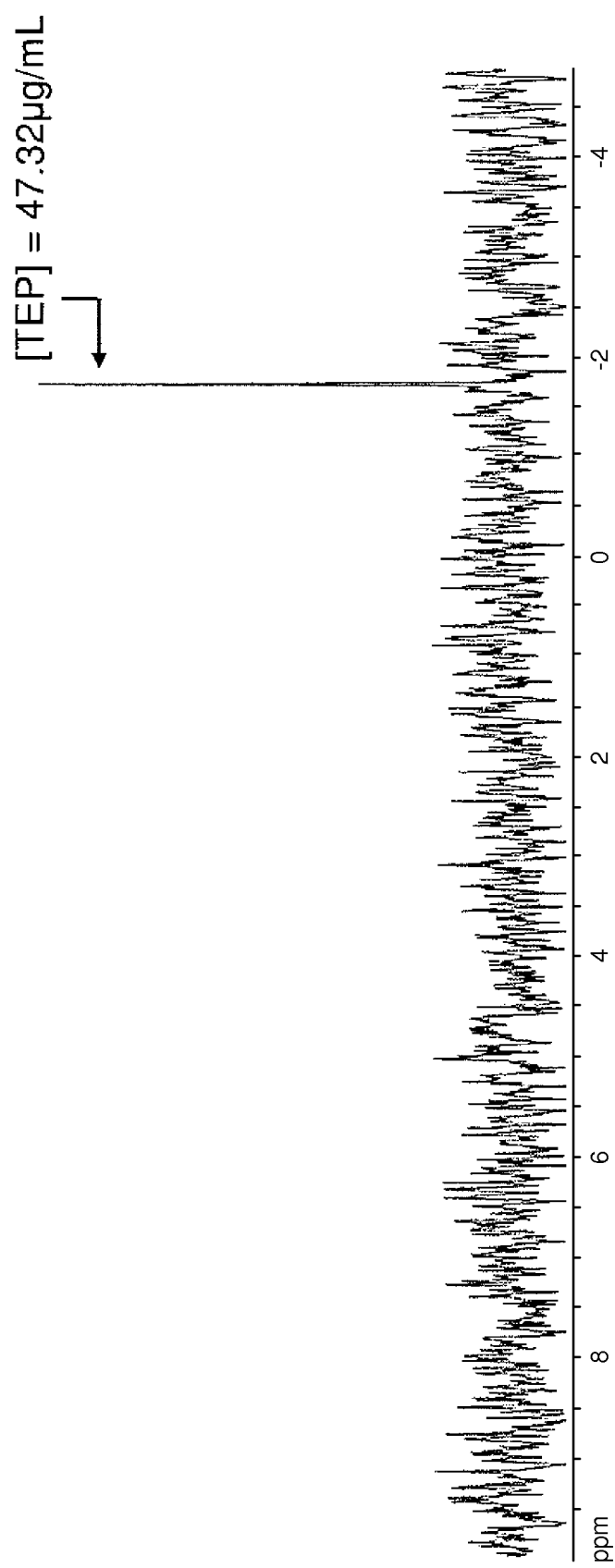
FIG. 3B is a $^{31}$P-NMR spectrum showing phospholipid content of a sonicated soy protein sample treated with both phospholipase $A_2$ (121 units phospholipase $A_2$/g soy protein) and β-cyclodextrin (10 mM). Triethyl phosphate (TEP) was used as a standard.

FIG. 3B is a $^{31}$P-NMR spectrum of sonicated (5 min at 65 W power) soy protein treated with both phospholipase $A_2$ (121 units phospholipase $A_2$/g soy protein) and β-cyclodextrin (10 mM). In this spectrum, the $^{31}$P-NMR signal for phospholipid was below the threshold of detection. This result is in accordance with the phospholipid determination by the phosphomolybdate assay, which showed almost complete elimination of phospholipid from soy protein samples under the treatment conditions described in these examples.

Large-Scale Preparation of Soy Protein Isolate:

To determine processing variables that could affect the efficiency of phospholipid removal by the combined sonication (5 min), phospholipase $A_2$ (121 units/g soy protein isolate), and β-cyclodextrin (10 mM) treatment method, 4 L of 8% soy protein isolate solution was processed as described above in the Materials and Methods for large-scale processing. The phospholipid content of the treated soy protein isolate sample was 0.4 mg/g soy protein isolate. The phospholipid content of the control soy protein isolate run under similar conditions but without any treatment was 3.1 mg/g soy protein isolate. This translates to about 88% removal of phospholipid. The 88% removal compares with the more than 97% removal of phospholipid observed in the small-scale preparations and with subsequent large-scale preparations (see below, including Table 6 and FIG. 5). A possible reason for this difference could be the way β-cyclodextrin-phospholipid complexes were separated from treated soy protein isolate in these two cases. In the small-scale preparations, the free β-cyclodextrin and β-cyclodextrin-phospholipid complexes were separated from soy protein isolate by precipitating the protein at pH 4.5. Since both β-cyclodextrin and β-cyclodextrin-phospholipid are water soluble, they could be removed from the soy protein isolate precipitate by centrifugation followed by washing thrice with deionized water at pH 4.5. However, in the present large scale preparation, a combination of ultrafiltration and diafiltration was used to remove β-cyclodextrin and β-cyclodextrin-phospholipid complexes from the treated soy protein isolate solution. It is possible that the removal of β-cyclodextrin-phospholipid and β-cyclodextrin using ultrafiltration/diafiltration in the present case was not as efficient as in the isoelectric precipitation method. It is also possible that the starting amount of phospholipid in the soy protein isolate varies batch-to-batch, potentially requiring longer than 5 min sonication time or modification of other conditions for complete phospholipid removal from some soy protein isolate batches. Compare, for example, the control phospholipid content in the present large-batch preparation (3.1 mg/g soy protein) versus that in the large-batch preparation shown in Table 6 (1.256 mg/g soy protein).

To determine if incomplete β-cyclodextrin or β-cyclodextrin-phospholipid removal accounted for the incomplete phospholipid removal in the current set of experiments, the residual amount of β-cyclodextrin in soy protein isolate was determined. It was found that about 36 mg β-cyclodextrin/g soy protein isolate was present in the ultrafiltered/diafiltered sample. Thus, much of the 0.4 mg of phospholipid/g soy protein isolate found in the ultrafiltered/diafiltered sample could be due to incomplete removal of β-cyclodextrin-phospholipid.

Free Fatty Acid Content:

An inescapable consequence of phospholipase $A_2$ hydrolysis of phospholipid is the production of free fatty acid and lysophospholipid. In the case of soy phospholipid, mostly long chain unsaturated fatty acids are produced upon phospholipase $A_2$ hydrolysis, and they have very limited solubility in water. Consequently, these free fatty acids may bind to and remain in hydrophobic pockets in proteins and can undergo auto-oxidation during processing or storage of soy protein isolate. Free fatty acids as well as lysophospholipids readily form inclusion complexes with β-cyclodextrin (Ivanova et al., 1996; Alahverdjieva et al. 2005). It is evident from the data in Table 2 that lysophospholipid was indeed removed by β-cyclodextrin. It is therefore desirable to ascertain if free fatty acids were also removed by β-cyclodextrin. The fatty acids present in the control and large-scale treated soy protein isolate samples were identified and quantified as fatty acid methyl esters by gas-liquid chromatography. As shown in Table 4, the total fatty acids in control soy protein isolate, as determined by acid-catalyzed and base-catalyzed transesterification, were 7.38 and 3.87 mg/g soy protein isolate, respectively. The difference between acid-catalyzed and base-catalyzed transesterification values indicates that the free fatty acid content of the control was 3.21 mg/g soy protein. Similarly, free fatty acid content in treated soy protein isolate was determined to be 0.24 mg/g soy protein (Table 4). The reduction in free fatty acid content upon β-cyclodextrin treatment was about 92.5%, which was similar in percentage to phospholipid reduction. This suggests that β-cyclodextrin complexes with both lysophospholipid and free fatty acid in a non-preferential manner. It should be noted that while 68% of the total fatty acids (determined by acid catalyzed transesterification) in control soy protein isolate were unsaturated fatty acids (i.e., C18:1, C18:2, C18:3 and arachidonic acids), only about 22% of the total fatty acids in the treated soy protein isolate was unsaturated. This tentatively suggests that β-cyclodextrin has a greater tendency to complex with polyunsaturated fatty acid than with saturated fatty acids such as C18:0 and C16:0.

Headspace Volatile Compounds Before and After Accelerated Storage:

Table 5 shows the concentration of headspace volatile compounds in the control and the large-scale treated soy protein isolate samples before and after accelerated storage for 90 days at 40° C.

TABLE 4

Fatty acid methyl ester (FAME) content (mg/g soy protein (SP)) obtained by acid-catalyzed transesterification (ACT) and base-catalyzed transesterification (BCT) of fatty acids in soy protein, as identified by gas-liquid chromatography.

| RT (min) | Fatty Acid Methyl Ester (FAME) | Control (mg/g SP) ACT | Control (mg/g SP) BCT | Treated (mg/g SP) ACT | Treated (mg/g SP) BCT |
|---|---|---|---|---|---|
| 7.603 | Hexadecanoic acid methyl ester | 2.26 ± 0.51 | 1.69 ± 0.32 | 0.33 ± 0.13 | 0.26 ± 0.06 |
| 10.252 | 9,12 Octadecadienoic acid methyl ester | 3.09 ± 0.81 | 1.76 ± 0.65 | 0.17 ± 0.14 | — |
| 10.415 | 9 Octadecenoic acid methyl ester | 0.28 ± 0.28 | — | — | 0.10 ± 0.00 |
| 10.693 | Octadecanoic acid methyl ester | 0.74 ± 0.20 | 0.42 ± 0.13 | 0.26 ± 0.06 | 0.16 ± 0.00 |
| 13.675 | 9,12,15 Octadecatrienoic acid methyl ester | 0.50 ± 0.46 | — | — | — |
| 13.903 | Methyl arachidate | 0.21 ± 0.05 | — | — | — |
| | TOTAL | 7.08 | 3.87 | 0.76 | 0.52 |

TABLE 5

Mean concentration values of volatile compounds obtained from 10% (w/v) soy protein dispersions by solid-phase microextraction technique.

| Compound | Fresh Samples Control (ppb) | Fresh Samples Treated (ppb) | 90 Day Storage Control (ppb) | 90 Day Storage Treated (ppb) | LSD | Odor Threshold[1] (ppb) | Flavor Threshold[1] (ppb) |
|---|---|---|---|---|---|---|---|
| Hexane | 1.92 | 0.00 | 0.00 | 0.00 | 0.348 | | |
| Pentanal | 0.00 | 0.00 | 6.04 | 0.00 | 1.690 | 12-42 | 31 |
| 3 Methyl butanal | 1.28 | 1.96 | 0.00 | 0.00 | 0.807 | | |
| 2 Ethyl furan | 0.00 | 0.00 | 4.90 | 1.98 | 2.156 | | |
| Dimethyl disulfide | 0.00 | 0.00 | 0.00 | 1.82 | 0.329 | 0.16-12 | 0.06-30 |
| 1-Pentanol | 0.00 | 0.00 | 4.89 | 0.00 | 0.955 | 4000 | |
| Hexanal | 14.31 | 0.00 | 184.79 | 23.17 | 48.530 | 4.5-5.0 | 16-76 |
| (E)-2-Nonenal | 0.00 | 0.00 | 4.53 | 0.00 | 0.173 | 0.08-0.1 | 6 |
| 1-Hexanol | 1.80 | 0.00 | 4.71 | 0.00 | 1.505 | 2500 | |
| 2-Heptanone | 0.00 | 0.00 | 37.64 | 7.83 | 32.334 | 140-3000 | 1000 |
| Heptanal | 0.00 | 0.00 | 15.53 | 0.00 | 2.884 | 3 | 21 |
| 2 Ethyl hexanal | 5.93 | 0.00 | 3.10 | 0.00 | 1.087 | | |
| 1-Heptanol | 0.00 | 0.00 | 1.99 | 0.00 | 0.435 | 3 | 31 |
| 1-octen-3-ol | 0.00 | 0.00 | 9.53 | 1.13 | 2.265 | 1 | |
| 5-Hepten-2-one, 6-methyl- | 0.00 | 0.00 | 3.97 | 2.18 | 0.934 | 50 | |
| 2 Pentyl furan | 3.63 | 1.53 | 208.73 | 35.57 | 39.400 | 6 | |
| Octanal | 0.00 | 0.00 | 17.56 | 0.00 | 4.015 | 0.7 | 5-45 |
| 3-Hepten-2-one, 5-methyl- | 0.00 | 0.00 | 10.53 | 0.00 | 2.341 | | |
| 3 Octen-2-one | 0.00 | 0.00 | 1.76 | 0.00 | 1.029 | | |
| 2-Octenal, (E)- | 0.00 | 0.00 | 1.31 | 0.00 | 0.531 | 3 | 90 |
| 2-ethyl-3,5-dimethyl-Pyrazine | 0.00 | 0.00 | 0.00 | 1.90 | 0.327 | 1 | |
| 2-nonanone | 0.00 | 0.00 | 5.56 | 0.00 | 3.395 | 5-200 | |
| Nonanal | 1.80 | 0.00 | 6.41 | 2.49 | 3.977 | 1 | 6-12 |
| 2-Decanone | 0.00 | 0.00 | 5.49 | 0.00 | 0.971 | | |
| Decanal | 0.00 | 0.00 | 2.59 | 1.89 | 0.469 | 0.1-2 | 7 |
| 2-butyl-2-octenal | 0.00 | 0.00 | 5.54 | 2.25 | 1.398 | | |
| Total | 30.67 | 3.49 | 547.10 | 82.20 | | | |

"Treated" refers to the large-scale treatment as described in the Materials and Methods.

[1]Leffingwell and Associates. Odor and flavor threshold in water (http://www.leffingwell.com/odorthre.htm).

In the freshly prepared control, seven volatile compounds, namely hexane, 3-methyl butanol, hexanal, 1-hexanol, 2-ethyl hexanal, 2-pentyl furan, and nonanal, were present. Hexane might be the leftover from solvent extraction of soybean oil. Among these compounds, the concentration of hexanal, a compound known to cause grassy off-favor, was above its odor threshold (4.5 ppb). On the other hand, the freshly treated soy protein isolate (large-scale) sample contained only 2 volatile compounds, namely, 3-methyl butanal and 2-pentyl furan. Occurrence of both these compounds in soy protein isolate has been previously reported (Boatright and Lei, 1999; Solina et al., 2005). In particular, presence of 2-pentyl furan is known to cause perception of beany off-flavor (Krishnamurthy, 1967). However, the amount of 2-pentyl pyridine detected in freshly treated soy protein isolate (1.53 ppb) was below its odor threshold (6 ppb). Overall, total concentration of volatile compounds in the freshly prepared control (30.67 ppb) was almost ten times the amount of total volatile compounds present in freshly treated soy protein isolate (3.49 ppb). The data suggest that polyunsaturated fatty acids in freshly treated soy protein isolate had undergone very limited oxidation and, irrespective of the amount of volatiles generated, most were removed along with phospholipid by the sonication-phospholipase $A_2$-β-cyclodextrin treatment.

The data in Table 5 also show that storage at 40° C. for 90 days caused a significant increase in the concentration of volatile compounds in the control (547 ppb) as well as in the treated soy protein isolate (82 ppb). Overall, 22 volatile compounds were identified in the control soy protein isolate after accelerated storage, whereas only 11 volatile compounds were identified in the treated soy protein isolate after accelerated storage under similar conditions. Accelerated storage caused a significant increase (p<0.05) in the concentration of all volatiles in both treated and control soy protein isolates. Among the volatiles showing the most noticeable changes in concentration in the treated soy protein isolate were 2-pentyl furan, hexanal, and 2-heptanone. The concentration of most of the volatiles detected was of the order of ppb. Previously, Hall et al (1985) reported that the kinetics of formation of volatile lipid oxidation products in a protein matrix during the accelerated stage can be expressed by an exponential kinetic model in the form, $$[H_t]=[H_o]e^{kt}$$

where $[H_o]$ the initial concentration of the volatile compound (e.g., hexanal) and $[H_t]$ is the final concentration at time t, and k is the rate constant. Assuming that the kinetics of formation of hexanal in control soy protein isolate follows the above model, from the data for hexanal in Table 5 (i.e., $[H_o]$=14.31 ppb and $[H_t]$=184.79 ppb, t=2160 h), it can be estimated that the rate constant for hexanal production in control soy protein isolate at 40° C. is about $1.184\times10^{-3}$ h$^{-1}$. Assuming that this is the case even in the treated soy protein isolate as well, the time it would have taken for the concentration of hexanal to reach the odor threshold concentration of 4.5 ppb (Table 5) would have been about 32 days during the accelerated storage at 40° C. Further, assuming that the formation of volatile lipid oxidation products in soy protein isolate follows Arrhenius kinetics, the rate constant for hexanal production at 25° C. can be estimated from the equation:

$$Q_{10} = \left(\frac{k_2}{k_1}\right)^{10/(T_2-T_1)}$$

where $k_1$ and $k_2$ are rate constants at temperature $T_1$ and $T_2$, and $Q_{10}$ is the ratio of rate constants when $T_2-T_1=10°$ C. Assuming a value of $Q_{10}=1.5$, the rate constant at 25° C. for the production of hexanal in soy protein isolate would be about $6.42\times10^{-4}$ h$^{-1}$. At this rate, it would take about 170 days for the hexanal concentration in the treated soy protein isolate to reach the odor threshold of 4.5 ppb at 25° C. These analyses clearly indicate that the sonication-phospholipase $A_2$-β-cyclodextrin—treated soy protein isolate could be stored for 170 days without loss of flavor quality. It should be pointed out that the residual amount of phospholipid in the treated soy protein isolate used in the accelerated storage study, which was prepared by the ultrafiltration/diafiltration method, was about 0.4 mg/g soy protein isolate. This was significantly higher than that prepared by the isoelectric precipitation method (0.26 mg/g soy protein isolate) (Table 2). We predict that the flavor stability of treated soy protein isolate prepared by the isoelectric precipitation method would be much better than that prepared by the ultrafiltration/diafiltration method.

Figure 4:
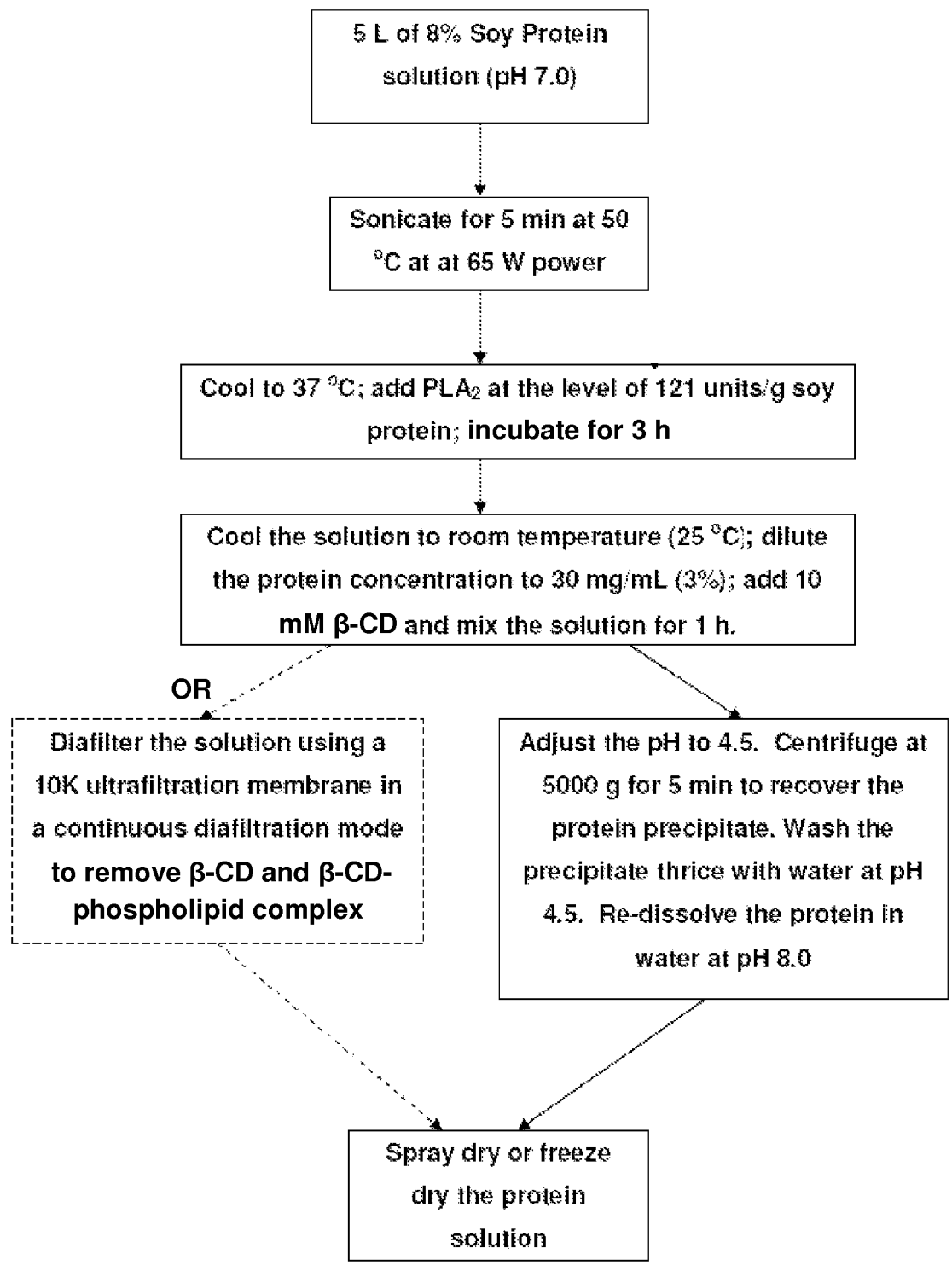
FIG. 4 is a flow chart of a version of the method for removing phospholipids and off-flavor compounds from soy protein isolate that includes sonication, phospholipase $A_2$ ($PLA_2$) treatment, and β-cyclodextrin (β-CD) treatment.
Figure 5:
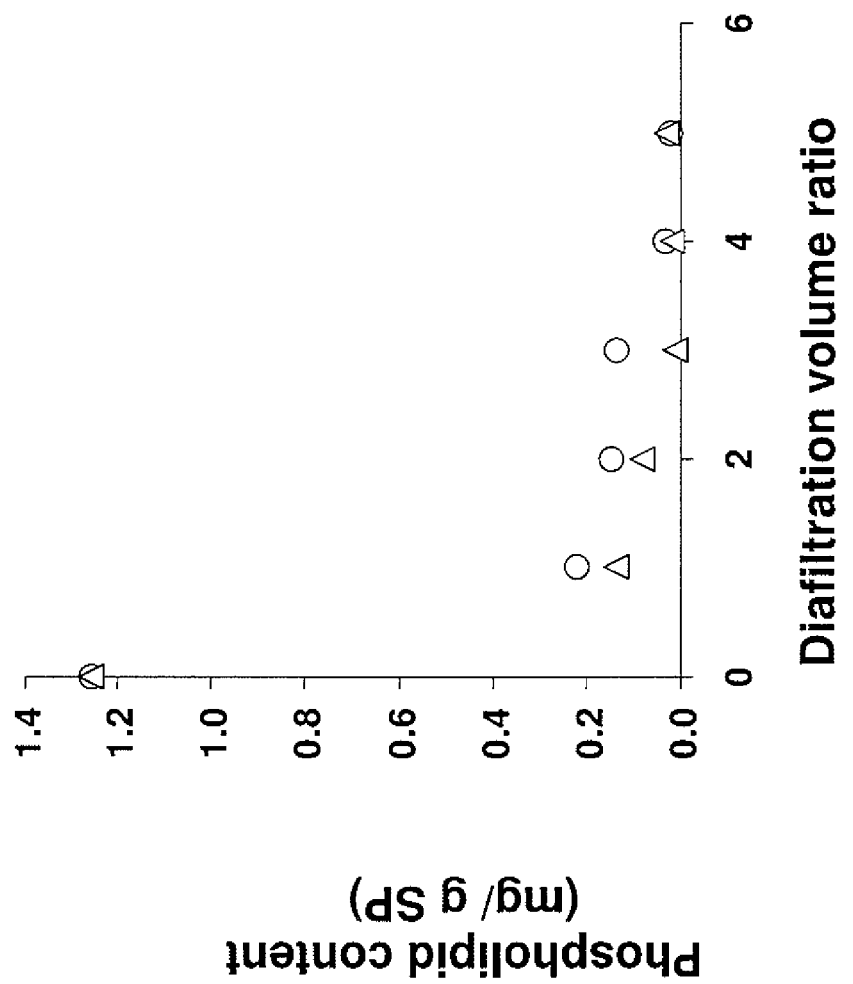
FIG. 5 is a graph depicting the efficiency of removing β-cyclodextrin-phospholipid complexes from β-cyclodextrin-treated soy protein (SP) solution by diafiltration against deionized water (○) or against deionized water containing 10 mM β-cyclodextrin (Δ).

Large-Scale Preparation of Soy Protein Isolate with Diafiltration and Isoelectric Precipitation:

To further evaluate the efficacy of the method in large-scale processes, studies involving 5 L of soy protein solution (8% w/w) were conducted according to the flow chart shown in FIG. 4, wherein β-cyclodextrin was removed through continuous diafiltration at various diafiltration ratios or by isoelectric precipitation. The diafiltration of treated soy protein solution in the continuous diafiltration mode was carried out with either deionized water (○) or with water containing 10 mM β-cyclodextrin (Δ), as shown in FIG. 5 and Table 6. The difference in phospholipid content between soy protein diafiltered with water alone compared to soy protein diafiltered with water and β-cyclodextrin was very small at each diafiltration volume ratio and was statistically insignificant at a volume ratio of 5. As shown in Table 4, the phospholipid content of the soy protein sample diafiltered at a diafiltration ratio of 5× was almost the same as the isoelectrically precipitated soy protein. We predict that the fatty acid content and the headspace volatile compound content would be similarly low.

TABLE 6

Effect of continuous diafiltration and isoelectric precipitation on efficiency of removal of β-cyclodextrin-phospholipid complexes from sonicated soy protein treated with phospholipase $A_2$ and β-cyclodextrin.

| Removal Method | Control 0 | Diafiltration Volume Ratio | | | | | |
|---|---|---|---|---|---|---|---|
| | | 1X | 2X | 3X | 4X | 5X | |
| Diafiltration −10 mM β-CD | 1.256 (0.069) | 0.223 (0.038) | 0.149 (0.003) | 0.136 (0.011) | 0.033 (0.025) | 0.023 (0.006) | — |
| Diafiltration +10 mM β-CD | 1.256 (0.069) | 0.136 (0.022) | 0.081 (0.047) | 0.012 (0.012) | 0.019 (0.002) | 0.031 (0.018) | — |
| Isoelectric Precipitation (pH 4.5) | — | — | — | — | — | — | 0.026 |

The continuous diafiltration was performed at various diafiltration ratios using deionized water with or without 10 mM β-cyclodextrin (β-CD). Values represent amount of phospholipid in mg/g soy protein. Values in parentheses represent standard deviation.

Discussion

The results of this investigation clearly show that phospholipid and free fatty acid in soy protein isolate can be efficiently removed under mild conditions by the sonication-phospholipase $A_2$-β-cyclodextrin treatment. Treatment of sonicated soy protein isolate with 267 units of phospholipase $A_2$/g soy protein isolate for 3 h, followed by treatment with 10 mM β-cyclodextrin facilitates complete removal of phospholipid. Reduction in phospholipid levels below 0.4 mg/g soy protein isolate significantly decreases off-odor development during storage of soy protein isolate. The color of the freeze dried treated soy protein isolate is whiter than that of the control soy protein isolate, suggesting that in addition to removing phospholipid, lysophospholipid, and free fatty acid, the sonication-phospholipase $A_2$-β-cyclodextrin treatment removes other small molecular weight phytochemicals present in soy protein isolate. Although further variations/improvements in processing parameters are possible, this method is easy to integrate with traditional soy protein isolate processing.

REFERENCES

Alahverdjieva V., Ivanova M., Verger R. & Panaiotov I. 2005. A kinetic study of the formation of β-cyclodextrin complexes with monomolecular films of fatty acids and glycerides spread at the air/water interface. *Colloids and Surfaces B: Biointerfaces* 42(1):9-20.

Anderson R. L. & Davis S. 1982. An organic phosphorus assay which avoids the use of hazardous perchloric acid. *Clin Chim Acta* 121(1):111-116.

Bender M. L. & Komiyama M. 1978. "Cyclodextrin Chemistry." Berlin, Germany: Springer-Verlag.

Boatright W. & Hettiarachchy N. 1995. Effect of lipids on soy protein isolate solubility. *Journal of the American Oil Chemists' Society* 72(12):1439-1444.

Boatright, W. L. & Lei, Q. 1999. Compounds Contributing to the "Beany" Odor of Aqueous Solutions of Soy Protein Isolates. *J. Food Sci.* 64(4), 667-670.

Brockerhoff H. 1963. Breakdown of phospholipids in mild alkaline hydrolysis. *The Journal of Lipid Research* 4(1): 96-99.

Connors K. A. 1997. The Stability of Cyclodextrin Complexes in Solution. *Chem. Rev.* 97(5):1325-1358.

Damodaran S. & Kinsella J. E. 1981. Interaction of carbonyls with soy protein: thermodynamic effects. *J. Agric. Food Chem.* 29(6):1249-1253.

Debouzy J. C., Fauvelle F., Crouzy S., Girault L., Chapron Y., Goschl M. & Gadelle A. 1998. Mechanism of a-cyclodextrin induced hemolysis. 2. A study of the factors controlling the association with serine-, ethanolamine-, and choline-phospholipids. *J. Pharm. Sci* 87(1):59-66.

Dennis E. A. 1983. "The Enzymes." New York: Academic Press.

Fauvelle F., Debouzy J. C., Crouzy S., Göschl M. & Chapron Y. 1997. Mechanism of a-cyclodextrin-induced hemolysis. 1. The two-step extraction of phosphatidylinositol from the membrane. *J. Pharm. Sci.* 86(8):935-943.

Grauby-Heywang C. & Turlet J.-M. 2008. Study of the interaction of [beta]-cyclodextrin with phospholipid monolayers by surface pressure measurements and fluorescence microscopy. *Journal of Colloid And Interface Science* 322(1):73-78.

Hall G., Anderson A. J., Lingnert H., & Olofsson B. 1985. Flavor changes in whole milk powder during storage. *J. Food Qual.* 7, 153-190.

Han X. Q. & Damodaran S. 1998. Purification and Characterization of Protease Q: A Detergent- and Urea-Stable Serine Endopeptidase from *Bacillus pumilus*. *J. Agric. Food Chem.* 46(9):3596-3603.

Hatzi P., Mourtas S., G. Klepetsanis P. & Antimisiaris S. G. 2007. Integrity of liposomes in presence of cyclodextrins: Effect of liposome type and lipid composition. *International Journal of Pharmaceutics* 333(1-2):167-176.

Homma S., Aida K. & Fujimaki M. 1985. Lipids of Soy Protein Isolate with Beany Flavor. *Daizu Tanpakushitsu Eiyo Kenkyukai Kaishi* 6(1):7-10.

Honig D. H., Warner K. A., Selke E. & Rackis J. J. 1979. Effects of residual solvents and storage on flavor of hexane/ethanol azeotrope extracted soy products. *J. Agric. Food Chem.* 27(6):1383-1386.

Ivanova M. G., Ivanova T., Verger R. & Panaiotov I. 1996. Hydrolysis of monomolecular films of long chain phosphatidylcholine by phospholipase $A_2$ in the presence of β-cyclodextrin. *Colloids and Surfaces B: Biointerfaces* 6(1):9-17.

Krishnamurthy R., Smouse T., Mookherjee B., Reddy B., & Chang S. 1967. Identification of 2-pentyl furan in fats and oils and its relationship to the reversion flavor of soybean oil. *J. Food Sci.* 32(4), 372-374.

Layne E. 1957. Spectrophotometric and turbimetric methods for measuring proteins. *Methods in Enzymology* 10:447-455.

Lee C. M., Trevino B. & Chaiyawat M. 1996. A simple and rapid solvent extraction method for determining total lipids in fish tissue. *J AOAC Int* 79(2):487-492.

Lendrath G. 1990. Behavior of Vegetable Phospholipids in Thin-Layer Chromatography: Optimization of Mobile Phase, Detection and Direct Evaluation. *Journal of Chromatography* 502:385.

Li Y. & Watkins B. A. 2005. Analysis of Fatty Acids in Food Lipids. Unit D1.2.1. In: Wrolstad, R. E., Acree, T. E., Decker, E. A., Penner, M. H., Reid, D. S., Schwartz, S. J., Shoemaker, C. F., Smith, D. S. & Sporns, P., editors. Handbook of Food Analytical Chemistry. First ed. Hoboken, N.J.: Wiley-Interscience. p. 437-451.

Lichtenberg D. & Schmidt C. F. 1981. Molecular packing and stability in the gel phase of curved phosphatidylcholine vesicles. *Lipids* 16(7):555-557.

Lin J. & Blank I. 2003. Odorants generated by thermally induced degradation of phospholipids. *J. Agric. Food Chem.* 51(15), 4364-4369.

Mabrouk A. & Dugan L. 1961. Solubility of linoleic acid in aqueous solutions and its reaction with water. *Journal of the American Oil Chemists' Society* 38(1):9-13.

Menashe M., Romero G., Biltonen R. L. & Lichtenberg D. 1986. Hydrolysis of dipalmitoylphosphatidylcholine small unilamellar vesicles by porcine pancreatic phospholipase $A_2$. *Journal of Biological Chemistry* 261(12):5328-5333.

Meneses P. & Glonek T. 1988. High resolution 31P-NMR of extracted phospholipids. The *Journal of Lipid Research* 29(5):679-689.

Nieuwenhuizen W., Kunze H. & de Haas G. H. 1974. Phospholipase $A_2$ (phosphatide acylhydrolase, EC 3.1.1.4) from porcine pancreas. *Methods Enzymol* 32(Part B):147-154.

Nishijo J. & Mizuno H. 1998. Interactions of cyclodextrins with DPPC liposomes. Differential scanning calorimetry studies. *Chem Pharm Bull* (Tokyo) 46(1):120-124.

Nishijo J., Shiota S., Mazima K., Inoue Y., Mizuno H. & Yoshida J. 2000. Interactions of cyclodextrins with dipalmitoyl, distearoyl, and dimyristoyl phosphatidyl choline liposomes. A study by leakage of carboxyfluorescein in inner aqueous phase of unilamellar liposomes. *Chem. Pharm. Bull* 48(1):48-52.

Ohtani Y., Irie T., Uekama K., Fukunaga K. & Pitha J. 1989. Differential effects of alpha-, beta- and gamma-cyclodextrins on human erythrocytes. *Eur J Biochem* 186(1-2):17-22.

Ohtsuru M. & Kito M. 1983. Association of phosphatidylcholine with soybean 11S globulin. *Agricultural and Biological Chemistry* 47(8):1907-1908.

Ohtsuru M., Yamashita Y., Kanamoto R. & Kito M. 1979. Association of phosphatidylcholine with soybean 7S globulin and its effect on protein conformation. *Agricultural and Biological Chemistry* 43(4):765-770.

Piel G., Piette M., Barillaro V., Castagne D., Evrard B. & Delattre L. 2007. Study of the relationship between lipid binding properties of cyclodextrins and their effect on the integrity of liposomes. *International Journal of Pharmaceutics* 338(1-2):35-42.

Puglisi G., Fresta M. & Ventura C. A. 1996. Interaction of Natural and Modified β-Cyclodextrins with a Biological Membrane Model of Dipalmitoylphosphatidylcholine. *Journal of Colloid And Interface Science* 180(2):542-547.

Rao C. S. & Damodaran S. 2004. Surface pressure dependence of phospholipase $A_2$ activity in lipid monolayers is linked to interfacial water activity. *Colloids and Surfaces B: Biointerfaces* 34(3):197-204.

Rulis A. M. 2001. Agency Response Letter. GRAS Notice No. GRN 000074. Office of Food Additive Safety. Center for Food Safety and Applied Nutrition. http://www.cfsan.fda.gov/~rdb/opa-g074.html Accessed online in Jun. 20, 2003.

Samoto M., Maebuchi M., Miyazaki C., Kugitani H., Kohno K., Hiritsuka M. & Kito M. 2007. Abundant proteins associated with lecithin in soy protein isolate. *Food Chemistry* 102:317-322.

Samoto M., Miyazaki C., Kanamori J., Akasaka T. & Kawamura Y. 1998. Improvement of the off-flavor of soy protein isolate by removing oil-body associated proteins and polar lipids. *Bioscience, Biotechnology, and Biochemistry* 62(5):935-940.

Schmid, G. Beta-cylodextrin. Wacker Biochem Corporation, Mich., USA. 2001. In FDA GRAS Notice Inventory. GRAS Notice No. GRN 000074. Available online at: http://www.accessdata.fda.gov/scripts/fcn/fcnNaviation.cfm?rpt=grasListing.

Shantha N. C. & Napolitano G. E. 1992. Gas chromatography of fatty acids. *J Chromatogr* 624(1-2):37-51.

Six D. A. & Dennis E. A. 2000. The expanding superfamily of phospholipase $A_2$ enzymes: classification and characterization. *BBA-Molecular and Cell Biology of Lipids* 1488(1-2):1-19.

Slotboom A. J., Verheij H. M., Haas G. H., Hawthorne J. N. & Ansell G. B. 1982. *Phospholipids*. Elsevier Press, Amsterdam, The Netherlands.

Smith D. M., Awad A. C., Bennink M. R. & Gill J. L. 1995. Cholesterol Reduction in Liquid Egg Yolk using β-Cyclodextrin. *Journal of Food Science* 60(4):691-694.

Solina M., Baumgartner P., R. L. J., & Whitfield, F. B. 2005. Volatile aroma components of soy protein isolate and acid-hydrolysed vegetable protein. *Food Chem.* 90(4), 861-873.

Sotirhos N., Herslof B. & Kenne L. 1986. Quantitative analysis of phospholipids by 31P-NMR. *The Journal of Lipid Research* 27(4):386-392.

Taneva S., Ariga K., Tagaki W. & Okahata Y. 1989. Association of amphiphilic cyclodextrins with dipalmitoylphosphatidylcholine in mixed insoluble monolayers at the air-water interface. *Journal of Colloid And Interface Science* 131(2):561-566.

Tarantino L. M. 2007. Agency Response Letter. GRAS Notice No. GRN 000212: Office of Food Additive Safety. Center for Food Safety and Applied Nutrition.

Taoukis P. S., Labuza T. P. & Saguy I. S. 1997. Kinetics of Food Deterioration and Shelf-Life Prediction. In: Handbook of Food Engineering Practice. 1st ed. Valentas, K. J.; Rotstein, E.; Singh, R.P. Eds.; CRC Press: Boca Raton, Fla., 361-404.

Tzen J. T. C. & Huang A. H. C. 1992. Surface structure and properties of plant seed oil bodies. *Journal of Cell Biology* 117:327-335.

Tzen J. T., Lie, G. C. & Huang A. H. 1992. Characterization of the charged components and their topology on the surface of plant seed oil bodies. *J. Biol. Chem.* 267(22), 15626-15634.

Vernin G. 1982. Chemistry of Heterocyclic Compounds in Flavours and Aromas. 1st ed. Ellis Horwood Limited: West Sussex, England.

Wolfe S. L. 1993. Molecular and cellular biology. Wadsworth Publishing Company.

Yu B. Z., Berg O. G. & Jain M. K. 1993. The divalent cation is obligatory for the binding of ligands to the catalytic site of secreted phospholipase $A_2$. *Biochemistry* 32(25): 6485-6492.

We claim:

1. A method for removing compounds that cause off-flavors in proteins, the method comprising:
   treating a protein-containing solution comprising a phospholipid with a phospholipase to yield a hydrolytic byproduct of the phospholipid in the solution;
   contacting the protein-containing solution with a cyclodextrin for a time wherein the cyclodextrin binds to the hydrolytic byproduct, thereby yielding a complex comprising the cyclodextrin bound to the hydrolytic byproduct; and then
   separating the complex from the protein-containing solution.

2. The method of claim 1 wherein the protein-containing solution is derived from oilseeds or oil-bearing cereal grain.

3. The method of claim 1 wherein the contacting step includes contacting the protein-containing solution with an unsubstituted or substituted β-cyclodextrin.

4. The method of claim 1 wherein the cyclodextrin in the contacting step is immobilized on a solid support.

5. The method of claim 1 wherein the treating step includes treating the protein-containing solution with a phospholipase $A_2$.

6. The method of claim 1 wherein the treating step includes treating the protein-containing solution with a phospholipase $A_2$ at a temperature of from about 20° C. to about 50° C. and at a concentration of from about 50 units to about 200 units phospholipase $A_2$ per gram of protein in the protein-containing solution.

7. The method of claim 1 wherein the hydrolytic byproduct comprises a product selected from the group consisting of a fatty acid, a free fatty acid, an unsaturated fatty acid, and a lysophospholipid.

8. The method of claim 1 wherein the phospholipase is selected from the group consisting of a phospholipase $A_1$, a phospholipase $A_2$, a phospholipase B, a phospholipase C, and a phospholipase D.

9. The method of claim 1 wherein the protein-containing solution in the treating step comprises purified, defatted protein.

10. A method for removing compounds that cause off-flavors in proteins, the method comprising:
sonicating a protein-containing solution comprising a phospholipid;
treating the protein-containing solution with a phospholipase to yield a hydrolytic byproduct of the phospholipid in the solution, wherein the sonicating is performed prior to the treating;
contacting the protein-containing solution with a cyclodextrin for a time wherein the cyclodextrin binds to the hydrolytic byproduct, thereby yielding a complex comprising the cyclodextrin bound to the hydrolytic byproduct; and then
separating the complex from the protein-containing solution.

11. The method of claim 10 wherein the sonicating step includes sonicating the protein-containing solution for at least about 2 minutes, at a temperature of from about 20° C. to about 70° C., and at a frequency of from about 10 kHz to about 30 kHz.

12. The method of claim 11 wherein the sonicating step includes sonicating the protein-containing solution for at least about 5 minutes.

13. The method of claim 1 wherein the separating step includes separating the complex from the protein-containing solution via ultrafiltration, dialysis, or precipitation.

14. The method of claim 1 wherein the separating step includes separating the complex from the protein-containing solution via isoelectric precipitation at a pH of from about 4 to 5.

15. The method of claim 1 wherein the separating step includes separating the complex from the protein-containing solution via ultrafiltration, wherein the ultrafiltration includes diafiltration.

16. The method of claim 15 wherein the diafiltration is performed with a diafiltration ratio of at least 2×.

17. The method of claim 15 wherein the diafiltration is performed with a diluent of water that includes a cyclodextrin.

18. The method of claim 10 wherein the protein-containing solution includes soy protein.

19. The method of claim 10 wherein the contacting step includes contacting the protein-containing solution with an unsubstituted or substituted β-cyclodextrin.

20. The method of claim 10 wherein the cyclodextrin is immobilized on a solid support.

21. The method of claim 10 wherein the treating step includes treating the protein-containing solution with a phospholipase $A_2$ at a temperature of from about 20° C. to about 50° C. and at a concentration of from about 50 units to about 200 units phospholipase $A_2$ per gram of protein in the protein-containing solution.

22. The method of claim 10 wherein the separating step includes separating the complex from the protein-containing solution via ultrafiltration using diafiltration at a diafiltration ratio of at least 2× or isoelectric precipitation at a pH of from about 4 to 5.

23. The method of claim 10 wherein the phospholipase is selected from the group consisting of a phospholipase $A_1$, a phospholipase $A_2$, a phospholipase B, a phospholipase C, and a phospholipase D.

24. The method of claim 10 wherein the protein-containing solution in the sonicating step comprises purified protein.

25. The method of claim 10 wherein the protein-containing solution in the sonicating step comprises purified, defatted protein.

26. A method for removing compounds that cause off-flavors in proteins, the method comprising:
treating a protein-containing solution comprising soy protein and a phospholipid with a phospholipase to yield a hydrolytic byproduct of the phospholipid in the solution;
contacting the protein-containing solution with a cyclodextrin for a time wherein the cyclodextrin binds to the hydrolytic byproduct, thereby yielding a complex comprising the cyclodextrin bound to the hydrolytic byproduct; and then
separating the complex from the protein-containing solution.

27. The method of claim 26 wherein the phospholipase is selected from the group consisting of a phospholipase $A_1$, a phospholipase $A_2$, a phospholipase B, a phospholipase C, and a phospholipase D.

* * * * *